(12) United States Patent
Weber

(10) Patent No.: US 11,626,990 B1
(45) Date of Patent: Apr. 11, 2023

(54) SYSTEM FOR ENERGY CONTRACTING THROUGH A DISTRIBUTED LEDGER

(71) Applicant: nZero, Inc., Carson City, CA (US)

(72) Inventor: Joshua Weber, Carson City, NV (US)

(73) Assignee: NZERO, INC., Carson City, NV (US)

( * ) Notice: Subject to any disclaimer, the term of this patent is extended or adjusted under 35 U.S.C. 154(b) by 246 days.

(21) Appl. No.: 17/089,523

(22) Filed: Nov. 4, 2020

Related U.S. Application Data

(60) Provisional application No. 62/931,015, filed on Nov. 5, 2019.

(51) Int. Cl.
| | |
|---|---|
| *H04L 29/06* | (2006.01) |
| *H04L 9/32* | (2006.01) |
| *H04L 9/06* | (2006.01) |
| *G06Q 20/06* | (2012.01) |
| *H04L 9/00* | (2022.01) |

(52) U.S. Cl.
CPC ......... *H04L 9/3213* (2013.01); *G06Q 20/065* (2013.01); *H04L 9/0643* (2013.01); *H04L 9/50* (2022.05); *H04L 2209/56* (2013.01)

(58) Field of Classification Search
CPC ....... H04L 9/3213; H04L 9/0643; H04L 9/50; H04L 2209/56; H04L 9/30; H04L 2209/38; H04L 9/0637; H04L 9/0618; H04L 9/3247; H04L 9/3239; H04L 9/3263; H04L 9/0656; G06Q 20/065; G06Q 20/06; G06Q 20/382; G06Q 20/401; G06Q 2220/00; G06Q 20/381; G06Q 40/04; G06Q 20/3825; G06Q 20/3827; G06F 21/62; G06F 21/6209; G06F 21/6218; G06F 21/6227; G06F 21/64; G06F 16/1824; G06F 21/44; G06F 21/629; G06F 16/2379; G06F 16/9027; G06K 9/00577; G06K 2009/00583

See application file for complete search history.

(56) References Cited

U.S. PATENT DOCUMENTS

| | | | |
|---|---|---|---|
| 10,762,564 | B2 | 9/2020 | Dechu et al. |
| 10,861,112 | B2 | 12/2020 | Forbes, Jr. et al. |
| 2018/0218176 | A1 | 8/2018 | Voorhees et al. |
| 2018/0225660 | A1 | 8/2018 | Chapman et al. |
| 2020/0111187 | A1* | 4/2020 | Vukich ............... G06Q 20/405 |
| 2020/0394652 | A1 | 12/2020 | Youb et al. |

\* cited by examiner

*Primary Examiner* — Malcolm Cribbs
(74) *Attorney, Agent, or Firm* — Wilson Sonsini Goodrich & Rosati

(57) ABSTRACT

Described are platforms, systems, and methods for providing a cryptographic record of an energy contract persisted as a confirm to a distributed ledger. In one aspect, a method comprises receiving confirm data comprising a plurality of obligations arising from an energy contract entered into by at least two parties, wherein the obligations comprise physical obligations for an amount of energy and financial obligations for the amount of energy; generating at least one token based on the obligations, wherein each token comprises a token state and a range for a unit for measuring the amount of energy; persisting a confirm to a distributed ledger, the confirm generated based on the confirm data and the at least one token; and providing a cryptographic record of the energy contract to each of the parties according to the confirm and the at least one token state.

28 Claims, 16 Drawing Sheets

700

DATA CENTER A
Resolve Curtailment

A curtailment occured for Data Center A, on 4/11 HE 01-03. We have provided a resolution proposal below. Review, adjust and sign to begin curtailment resolution. For questions lorum ipsum dolor sit amet.

STEP 1: OVERVIEW STEP 2: REVIEW HOURS STEP 3: SIGN AND CONFIRM

HE 01            6/12 CURTAILED

| TOKEN ID | CONFIRM | ORIGINAL $ | CURTAIL TO | |
|---|---|---|---|---|
| 2313 | 2 | $22 | ☐ | $22 |
| 4564 | 2 | $22 | ☐ | $22 |
| 1522 | 2 | $22 | ☐ | $22 |
| 7865 | 2 | $22 | ☐ | $22 |
| 2313 | 2 | $22 | ☐ | $22 |
| 2313 | 2 | $22 | ☐ | $22 |
| 2313 | 2 | $22 | ☐ | $22 |
| 4564 | 1 | $34 | ☑ | $34 |
| 1522 | 1 | ~~$34~~ | ☑ | $44 |
| 7865 | 1 | ~~$34~~ | ☑ | $44 |
| 2313 | 1 | ~~$34~~ | ☑ | $44 |
| 2313 | 1 | ~~$34~~ | ☑ | $44 |
| 4564 | 1 | ~~$34~~ | ☑ | $44 |
| 1522 | 1 | ~~$34~~ | ☑ | $44 |
| 7865 | 1 | $34 | ☐ | $34 |
| 2313 | 1 | $34 | ☐ | $34 |
| 2313 | 1 | $34 | ☐ | $34 |

Totals    17 Tokens      $494    6/6   $554

Save as pdf      BACK    NEXT

FIG. 7A

SYSTEM FOR ENERGY CONTRACTING THROUGH A DISTRIBUTED LEDGER

CROSS-REFERENCE

This application claims the benefit of U.S. Provisional Application Ser. No. 62/931,015 filed Nov. 5, 2019, which is hereby incorporated herein by reference in its entirety.

BACKGROUND

A distributed ledger can be described as a ledger of any transactions or contracts maintained in decentralized form across different locations and people, eliminating the need of a central authority to keep a check against manipulation. All the information on it is securely and accurately stored using cryptography and can be accessed using keys and cryptographic signatures. Once the information is stored, it becomes an immutable database, which the rules of the network govern. Distributed ledgers are inherently harder to attack than, for example, a centralized ledger because all the distributed copies need to be attacked simultaneously for an attack to be successful. Moreover, these records are resistant to malicious changes by a single party.

SUMMARY

In a general embodiment, disclosed herein are computer-implemented methods for providing a cryptographic record of an energy contract persisted as a confirm to a distributed ledger, the method being executed by one or more processors and comprising: receiving confirm data comprising a plurality of obligations arising from an energy contract entered into by at least two parties, wherein the obligations comprise physical obligations for an amount of energy and financial obligations for the amount of energy; generating at least one token based on the obligations, wherein each token comprises a token state and a range for a unit for measuring the amount of energy; persisting a confirm to a distributed ledger, the confirm generated based on the confirm data and the at least one token; and providing a cryptographic record of the energy contract to each of the parties according to the confirm and the at least one token state.

In another general embodiment, one or more non-transitory computer-readable storage media coupled to one or more processors and having instructions stored thereon which, when executed by the one or more processors, cause the one or more processors to perform operations comprising: receiving confirm data comprising a plurality of obligations arising from an energy contract entered into by at least two parties, wherein the obligations comprise physical obligations for an amount of energy and financial obligations for the amount of energy; generating at least one token based on the obligations, wherein each token comprises a token state and a range for a unit for measuring the amount of energy; persisting a confirm to a distributed ledger, the confirm generated based on the confirm data and the at least one token; and providing a cryptographic record of the energy contract to each of the parties according to the confirm and the at least one token state.

In yet another general embodiment, disclosed herein are energy contracting systems, comprising: a distributed ledger; one or more processors; and a computer-readable storage device coupled to the one or more processors and having instructions stored thereon which, when executed by the one or more processors, cause the one or more processors to perform operations comprising: receiving confirm data comprising a plurality of obligations arising from an energy contract entered into by at least two parties, wherein the obligations comprise physical obligations for an amount of energy and financial obligations for the amount of energy; generating at least one token based on the obligations, wherein each token comprises a token state and a range for a unit for measuring the amount of energy; persisting a confirm to the distributed ledger, the confirm generated based on the confirm data and the at least one token; and providing a cryptographic record of the energy contract to each of the parties according to the confirm and the at least one token state.

An aspect combinable with the general embodiments, the confirm is subject to a master services agreement.

In an aspect combinable with any of the previous aspects, the physical obligations comprise delivery of the amount of energy to a facility associated, or a point nominated by, with at least one of the parties.

In an aspect combinable with any of the previous aspects, the financial obligations comprise a payment amount for the amount of energy.

In an aspect combinable with any of the previous aspects, the amount of energy includes a first set of megawatt hours.

In an aspect combinable with any of the previous aspects, the energy contract is signed by the at least two parties.

In an aspect combinable with any of the previous aspects, the unit for measuring the amount of energy comprises a megawatt hour.

In an aspect combinable with any of the previous aspects, the range is between and including zero megawatt hours and one megawatt hour.

In an aspect combinable with any of the previous aspects, each token state reflects changes that includes pricing changes, quantity changes, changes in delivery cost, changes in a physical obligation, source of the energy, renewable attributes, or carbon content of the energy or resolution of the respective token.

In an aspect combinable with any of the previous aspects, the pricing changes are due to due to markets adjustments.

In an aspect combinable with any of the previous aspects, the quantity changes include actual consumption at a time of consumption or actual production at a time of production.

In an aspect combinable with any of the previous aspects, changes to the token state are persisted to the distributed ledger.

In an aspect combinable with any of the previous aspects, each token state is updated in real-time according to real-time markets for any energy that is being used that is over or under the at least one of the obligations.

In an aspect combinable with any of the previous aspects, the distributed ledger comprises a blockchain.

In an aspect combinable with any of the previous aspects, the blockchain is accessible by only the parties.

In an aspect combinable with any of the previous aspects, the methods or the operations comprise: receiving curtailment data regarding the confirm; repricing the at least one token according to the curtailment data; and providing dispute resolution to the parties based on the repriced at least one token.

In an aspect combinable with any of the previous aspects, the at least one token is repriced by identifying a most likely source of a disruption and the at least one token that would have been affected by the disruption.

In an aspect combinable with any of the previous aspects, the methods or the operations comprise: matching a cover price for liquidated damages to a price that was associated with the at least one token that were actually curtailed.

In an aspect combinable with any of the previous aspects, the cryptographic record comprises resolution data for any previous day.

In an aspect combinable with any of the previous aspects, the cryptographic record comprises an amount energy reserved for the future and a pricing at which the future amount of energy is reserved.

In an aspect combinable with any of the previous aspects, the methods or the operations comprise: providing, to at least one of the parties, information regarding additional confirms to put in place for future hours, the information determined based on the cryptographic record.

In a general embodiment, disclosed herein are computer-implemented methods for maintaining, through a distributed ledger, a stated of a confirm between a plurality of nodes each privy to the confirm, the method being executed by one or more processors and comprising: receiving data relating to an obligation arising from an energy contract entered into by a plurality of parties; determining an update to a state of a confirm based on the received data, wherein the confirm is stored to a distributed ledger and provides a cryptographic record of the energy contract among the parties; and persisting, to the distributed ledger, the update to the state of the confirm to maintain a shared state of the confirm between a plurality of nodes, wherein each node is associated with a respective party to the energy contract.

In another general embodiment, one or more non-transitory computer-readable storage media coupled to one or more processors and having instructions stored thereon which, when executed by the one or more processors, cause the one or more processors to perform operations comprising: receiving data relating to an obligation arising from an energy contract entered into by a plurality of parties; determining an update to a state of a confirm based on the received data, wherein the confirm is stored to a distributed ledger and provides a cryptographic record of the energy contract among the parties; and persisting, to the distributed ledger, the update to the state of the confirm to maintain a shared state of the confirm between a plurality of nodes, wherein each node is associated with a respective party to the energy contract.

In yet another general embodiment, disclosed herein are confirm state maintenance system, comprising: a distributed ledger; one or more processors; and a computer-readable storage device coupled to the one or more processors and having instructions stored thereon which, when executed by the one or more processors, cause the one or more processors to perform operations comprising: receiving data relating to an obligation arising from an energy contract entered into by a plurality of parties; determining an update to a state of a confirm based on the received data, wherein the confirm is stored to a distributed ledger and provides a cryptographic record of the energy contract among the parties; and persisting, to the distributed ledger, the update to the state of the confirm to maintain a shared state of the confirm between a plurality of nodes, wherein each node is associated with a respective party to the energy contract.

An aspect combinable with the general embodiments, the confirm is signed by the parties.

In an aspect combinable with any of the previous aspects, the energy contract comprises two parties.

In an aspect combinable with any of the previous aspects, the energy contract comprises more than two parties.

In an aspect combinable with any of the previous aspects, at least one other node is associated with a party with no privity to the energy contract In an aspect combinable with any of the previous aspects, the other node has no access to the confirm or the distributed ledger.

In an aspect combinable with any of the previous aspects, the obligation is associated with at least one of the parties to the energy contract.

In an aspect combinable with any of the previous aspects, the obligation comprises a physical obligation for an amount of energy or a financial obligation for the amount of energy.

In an aspect combinable with any of the previous aspects, the obligation is associated with a token assigned to the confirm.

In an aspect combinable with any of the previous aspects, each of the nodes is privy to the token and has at least one obligation related to the token.

In an aspect combinable with any of the previous aspects, each token comprises a token state and a range for a unit for measuring the amount of energy.

In an aspect combinable with any of the previous aspects, the unit for measuring the amount of energy comprises a megawatt hour.

In an aspect combinable with any of the previous aspects, the range is between and including zero megawatt hours and one megawatt hour.

In an aspect combinable with any of the previous aspects, a network operator provides access control, and sets rules, for the nodes.

In an aspect combinable with any of the previous aspects, the network operator does not have access to the distributed ledger shared between the nodes.

In an aspect combinable with any of the previous aspects, the nodes communicate with one another and not with the network operator to maintain the shared state of the confirm.

In an aspect combinable with any of the previous aspects, the network operator generates new nodes for each party to a newly received energy contract.

In an aspect combinable with any of the previous aspects, the network operator acts as a notary service to maintain consensus between the nodes.

In an aspect combinable with any of the previous aspects, the nodes access the distributed ledger and the confirm through a dashboard.

In an aspect combinable with any of the previous aspects, the dashboard: receives energy consumption data for a facility associated with at least one of the parties or provider data regarding a physical flow from a provider facility associated with at least one of the parties to the facility via an energy grid; and provides, to the nodes, the received energy consumption data or the provider data as the data relating to the obligation.

In an aspect combinable with any of the previous aspects, the energy consumption data is regarding electricity consumption, natural gas consumption, oil consumption, or non-energy attributes of renewables.

In an aspect combinable with any of the previous aspects, the non-energy attributes of renewables include carbon offset, carbon credits, or renewable energy credits.

In an aspect combinable with any of the previous aspects, the energy consumption data is received from electric meters associated with the facility.

In an aspect combinable with any of the previous aspects, the dashboard provides, to each of the nodes, access in real-time to energy markets.

In an aspect combinable with any of the previous aspects, the data accessed in real-time from the energy markets includes energy costs for a particular hour at a particular location.

In an aspect combinable with any of the previous aspects, the distributed ledger comprises a blockchain.

In an aspect combinable with any of the previous aspects, the blockchain is accessible by only the nodes.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 7A-7C depict various non-limiting example pages of a user interface (UI) for a dashboard provided by the described energy contracting system.

DETAILED DESCRIPTION

Figure 1A:
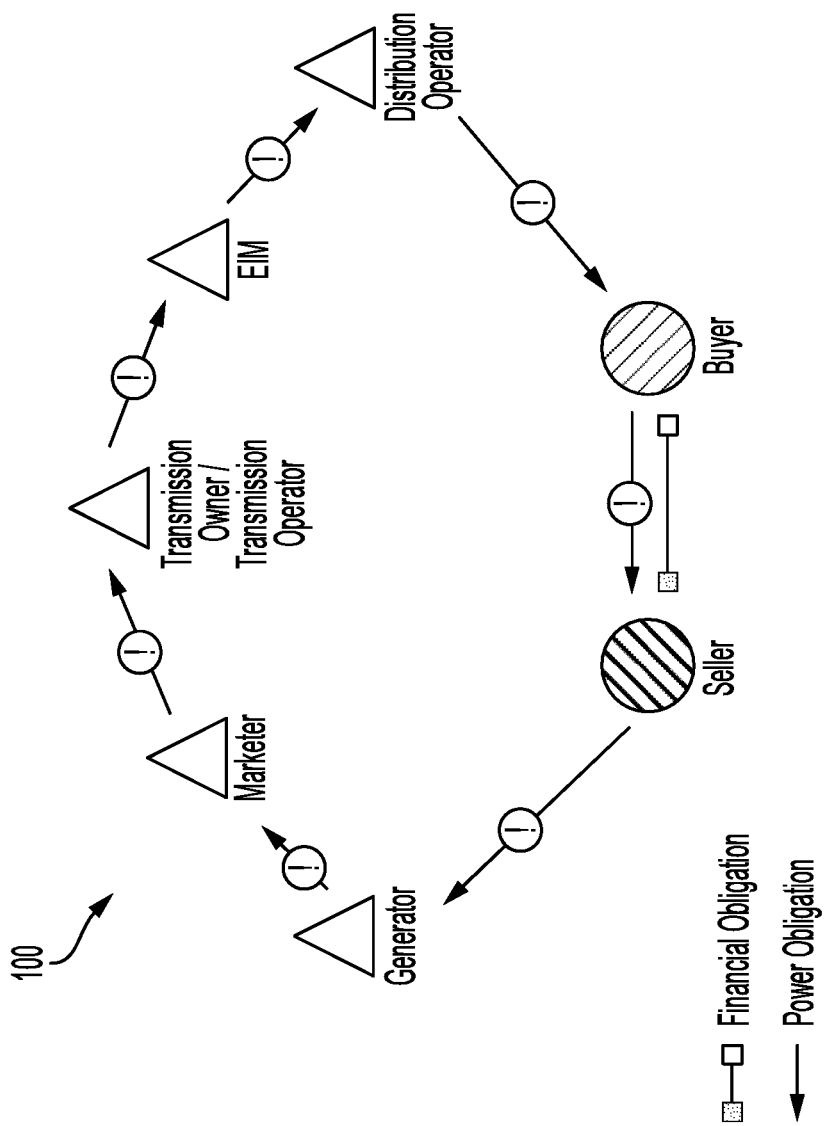
FIG. 1A depicts a block diagram of the fundamental mismatch between a physical power grid and financial power markets.

Embodiments of the present disclosure are generally directed to systems, platforms, and methods for providing a cryptographic record of an energy contract persisted as a confirm to a distributed ledger. In some embodiments, the methods, systems, and platforms include operations comprising: receiving confirm data comprising a plurality of obligations arising from an energy contract entered into by at least two parties, wherein the obligations comprise physical obligations for an amount of energy and financial obligations for the amount of energy; generating at least one token based on the obligations, wherein each token comprises a token state and a range for a unit for measuring the amount of energy; persisting a confirm to a distributed ledger, the confirm generated based on the confirm data and the at least one token; and providing a cryptographic record of the energy contract to each of the parties according to the confirm and the at least one token state.

Certain Definitions

Unless otherwise defined, all technical terms used herein have the same meaning as commonly understood by one of ordinary skill in the art to which this disclosure belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

Smart contracts are digitization of the legal contracts and include executable code which represents, for example, contract terms. As such, a smart contract not only defines the rules and penalties related to an agreement in the same way that a traditional contract does, but also automatically enforces those obligations. A smart contract may accomplish this by taking information as input, assigning a value to that input through the rules set out in the contract, and executing the actions required by those contractual clauses. For example, a smart contract may determine whether an asset should be sent to a destination entity or whether it should be returned to an originating entity. Smart contacts may be coded in a programming language, such as Solidity™ For example, a smart contract may be programed to deliver payment when an item is received. In this format, a contract is converted to computer code, stored and replicated on the system, and supervised by a network of computers that run the blockchain. Smart contracts can call other smart contract just like an Object-oriented object to create and use objects of another class. Smart contracts can store data. The data stored can be used to record information, fact, associations, balances and any other information needed to implement logic for real world contracts. In some embodiments, a smart contract is deployed, stored, and executed within the virtual machine.

Distributed Ledger/Blockchain Overview

An example distributed ledger is the commonly known Blockchain (or blockchain). Blockchain is referenced within the present disclosure for purposes of illustration. It is contemplated, however, that any appropriate distributed ledger can be used in implementations of the present disclosure. A blockchain is a continuously growing list of records or blocks that are linked and secured using cryptography. Each block with the blockchain may include transaction data provided from transactions that have been executed in one or more contexts, such as negotiable instrument transactions, digital currency transactions, and so forth. In some examples, a transaction includes an agreement between a buyer and seller, a supplier and a consumer, or a provider and a consumer that there would be exchange of assets, products or services in lieu of currency, cryptocurrency or some other asset either in present or in future. In some examples, a single block may include transaction data provided from multiple transactions (e.g., multiple deposits of different checks by different people). A blockchain may grow as completed blocks are added with a new set of transactions thus forming a ledger of the transaction. Each block may include a hash pointer to a previous block and a timestamp along with the transaction data in a permanent manner.

In some embodiments, the transactions in a block of a blockchain are hashed and encoded into a Merkle tree (e.g., the transactions are leaf nodes of a Merkle tree). A Merkle tree (or hash-based tree) is a hash-based data structure that is a generalization of a hash list. A Merkle tree includes a tree structure in which each leaf node is a result of a cryptographic hash function (CHF) applied to the transaction to generate a hash value or "hash" and each non-leaf node is labelled with the cryptographic hash of the labels of its child nodes. Example CHF include the secure hash algorithm 256 (SHA-256), SHA-3, and message digest 5 (MD5), among others. In general, the CHF receives information as input, and provides a hash value as output. The hash value can be a predetermined length. For example, SHA-256 outputs a 256-bit (32-byte, 64-character) hash value. In some examples, the hash value is a one-way hash value, in that the hash value cannot be 'un-hashed' to determine what the input was. Additionally, a Merkle tree may be implemented as a k-ary tree, which is a rooted tree data structure in which each node has no more than k children. For example, a Merkle tree may be implemented as binary tree where each node may have 0, 1, or 2 children. The Merkle root (or root hash) of such a binary tree can be generated by repeatedly hashing each pair of nodes until only one hash is left. In some examples, when the number of transactions is odd, the last hash is duplicated once to create an even number of leaf nodes. If a single detail in any of the transactions or the order of the transactions changes, so does the Merkle root. As such, the Merkle root summarizes all of the data in the related transactions and can be stored in a block to maintain the integrity of the data. Thus, the employment of a Merkle tree allows for a quick and simple test of whether a specific transaction is included in the set or not.

In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, etc.) to validate a requested transaction, entities must agree on which transactions have actually occurred, and in which order. For example, if two entities observe different transaction histories, they will be unable to come to the same conclusion regarding the validity of a transaction. The blockchain enables the entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

A typical peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof-of-work (PoW) before their proposed block of transactions is accepted by the peer-to-peer network. A blockchain protocol includes a PoW scheme that is based on a CHF. In some embodiments, the blockchain protocol can require multiple pieces of information as input to the CHF. For example, the input to the CHF can include a reference to the previous (most recent) block in the blockchain, details of the transaction(s) that are to be included in the to be created block, and a nonce value.

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In a blockchain-based smart contract platform, for example, each block producing node in may go through a number of steps to create a candidate block. For example, a number of transactions are selected from a publicly-shared pool of pending transactions. In some embodiments, the selected transactions are assigned in an order in, for example, a linear list. Typically, there is some mechanism to limit the maximum number of transactions that can be included. In many embodiments, however, there is no enforced minimum. Computations specified by the transactions are performed. In some embodiments, each computation has access to a global shared state, and can make certain changes to that shared state. Moreover, in some embodiments, the input of one transaction could depend on the output of another transaction. In such embodiments, it is important that these computations are strictly performed in order. The transactions are combined with a snapshot of the final global state resulting from processing those transactions. The results are broadcast to the rest of the network. In some embodiments, the "snapshot" is a hash of the global state, and can be in the form of, for example, the root node of a Merkle tree.

In some embodiments, each node in the network that receives a candidate block verifies that the computations implied by the transaction list have been computed correctly. These nodes re-perform all of the computations in the order specified by the candidate block. The nodes then compare the snapshot of the final global state they have computed with the snapshot in the candidate block from the original node. If the snapshots match, the block is considered a valid candidate.

In unspent transaction output (UTXO) blockchains, such as Bitcoin, only transactions that successfully transfer tokens can be included in a block. On the other hand, in state-model blockchains, like Ethereum and Zeus, it is valid (and even common) to include transactions that fail. In some embodiments, these transactions are included in the block, but do not modify the global state (aside from the payment of the transaction fees). Thus, a transaction that is "processed correctly" may not actually do what was intended by user initiating the transaction.

Once one or more valid candidate blocks are produced, the network uses some consensus mechanism for collectively agreeing on a single valid candidate. This is typically "POW" in current blockchains, but there are many proposals for future networks—or evolutions of existing networks—that use "proof-of-stake". The embodiments decentralized computation system, described herein, work equally well with either family of consensus mechanisms, but is most powerful when coupled with instant-finality, proof-of-stake consensus.

FIG. 1A depicts a block diagram 100 of the fundamental mismatch between a physical power grid and financial power markets. As depicted, the entities create inefficiency, opportunities, and high transaction loss with low transaction speed.

Figure 1B:
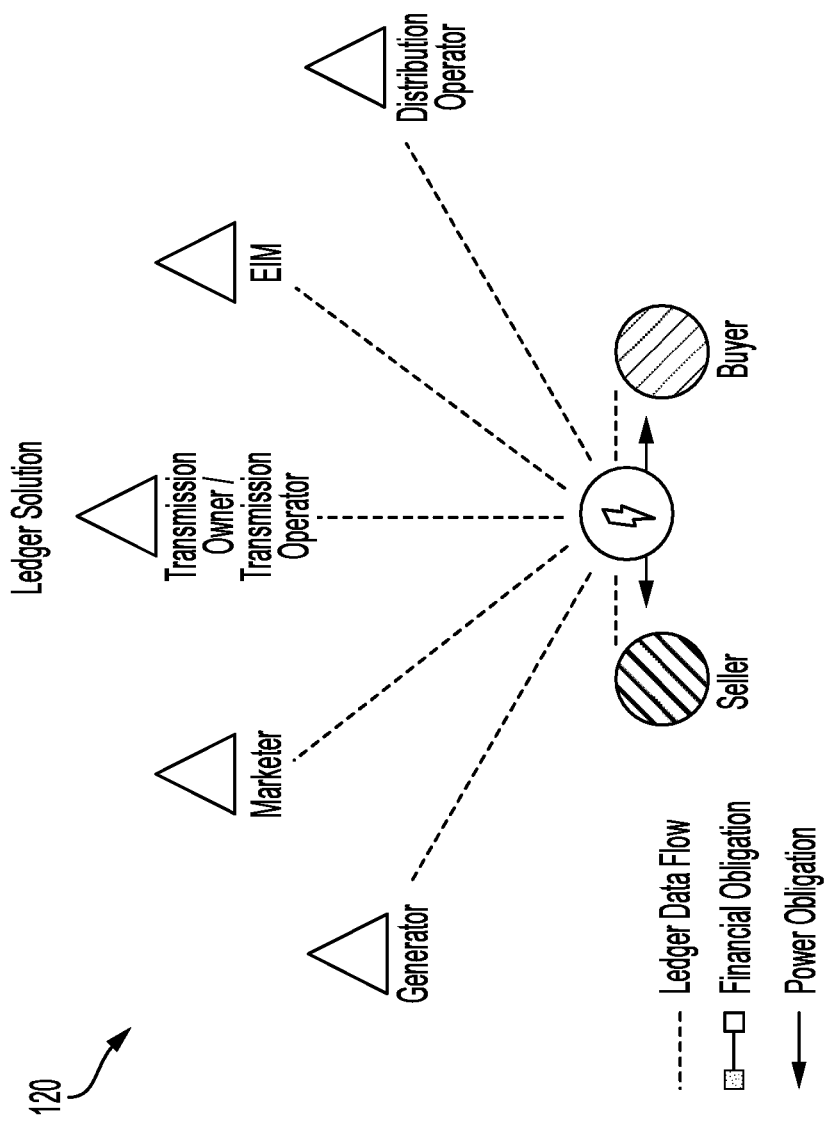
FIG. 1B depicts a block diagram of a non-limiting example solution provided by the described energy contracting system.

FIG. 1B depicts a block diagram 120 of a solution provided by the described energy contracting system. The depicted solution provides tokens that are stored and cryptographically ensure privacy and auditability of state changes to each transacted MWH creating a shared state as to obligations between parties. The depicted solution eliminates inefficiencies, reduces arbitrage, through shared marked visibility, reduces transaction cost, and increases transaction speed.

Figure 2:
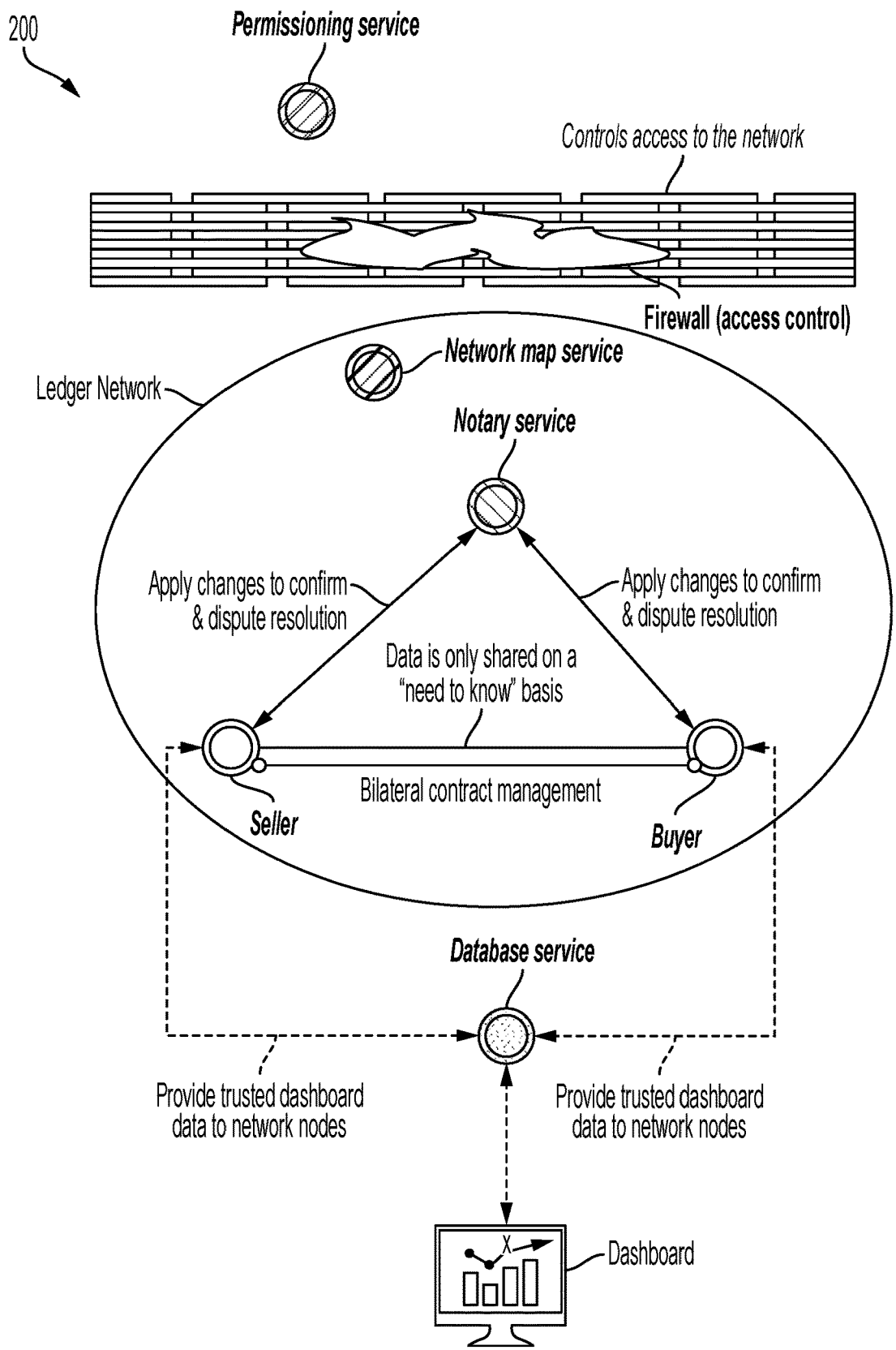
FIG. 2 depicts a non-limiting example platform provided by the described energy contracting system.
Figure 3A:
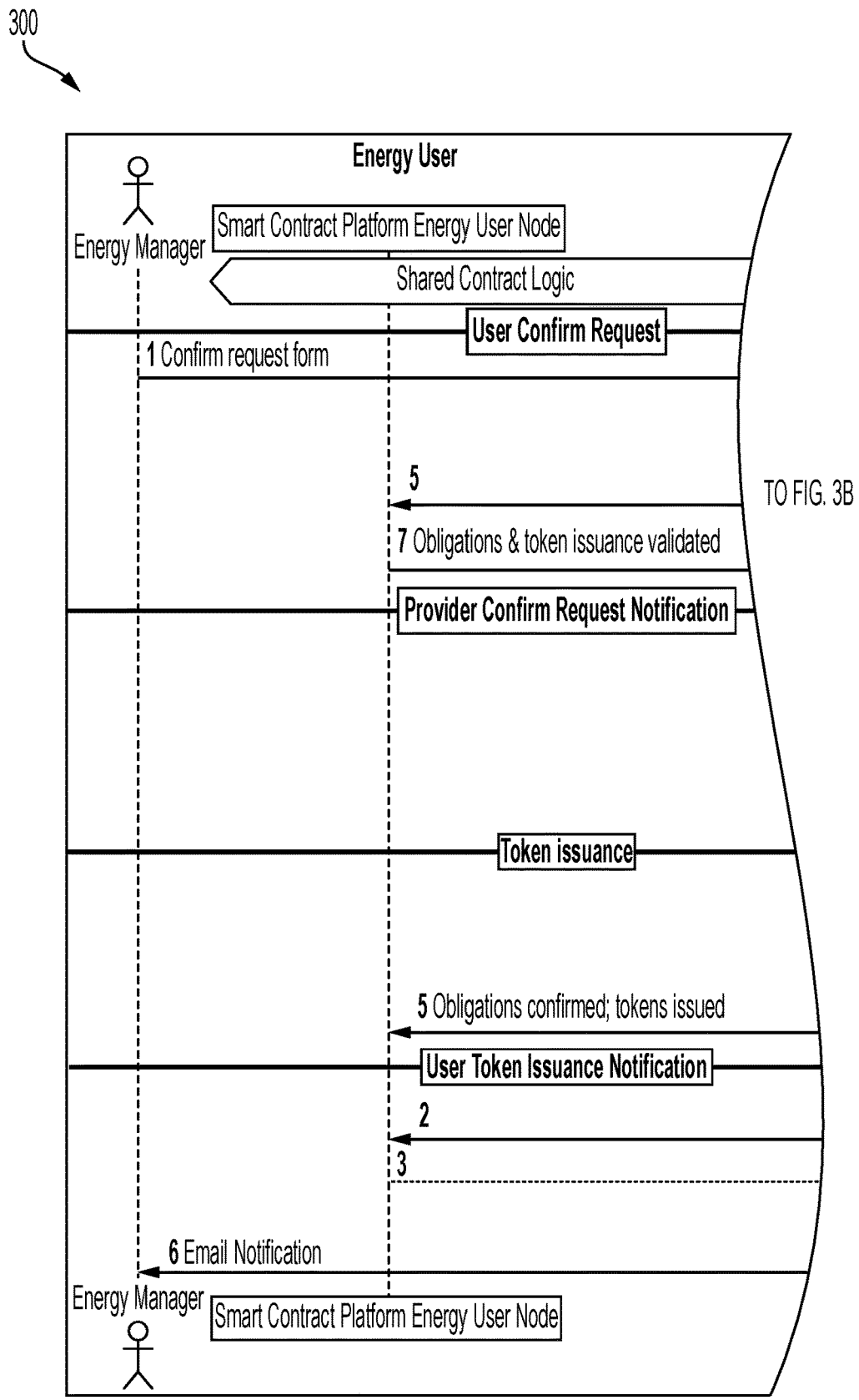
FIGS. 3A-3D depict a non-limiting example process for a confirm request cycle built around a token(s)
Figure 3B:
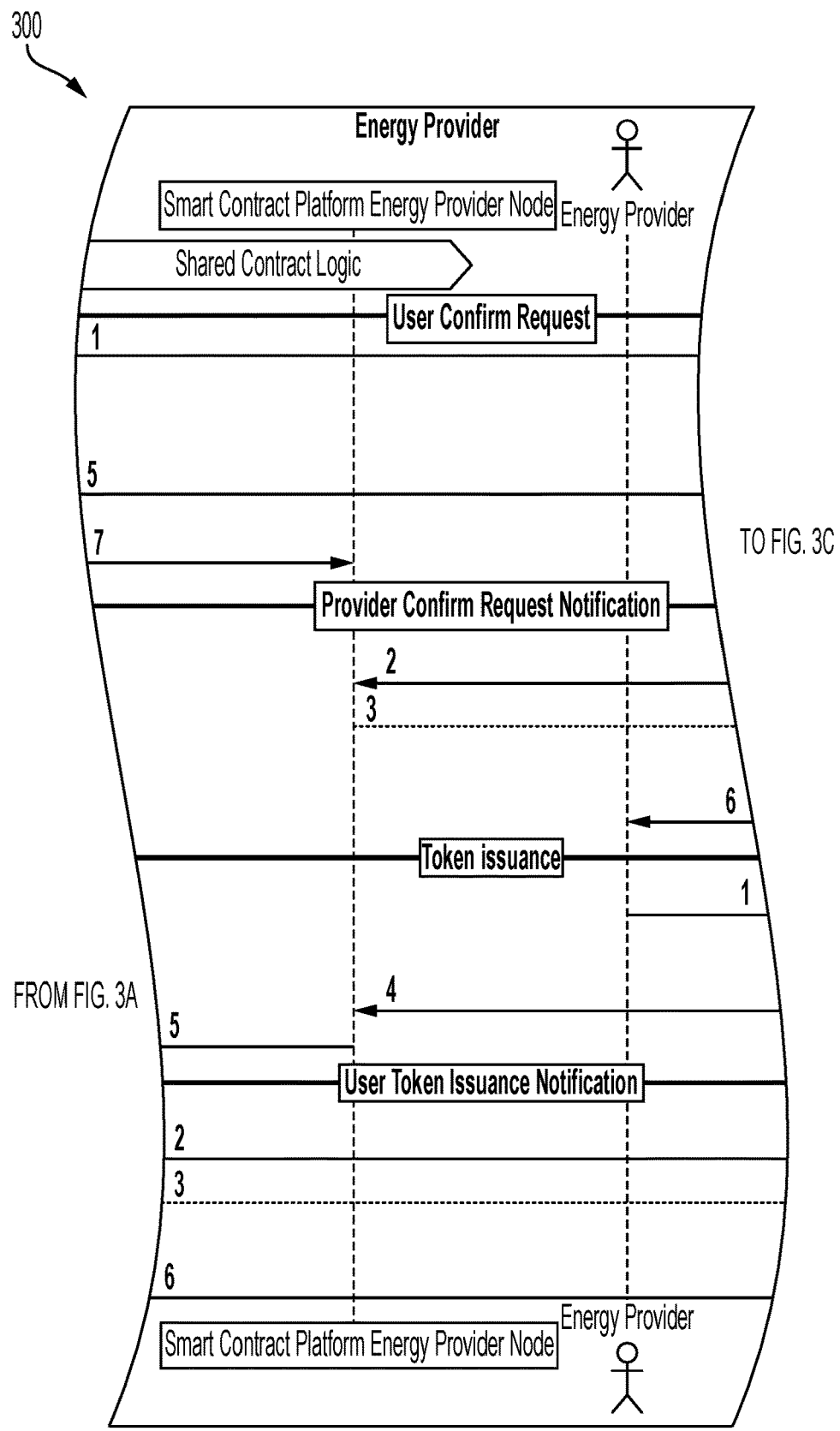
Figure 3C:
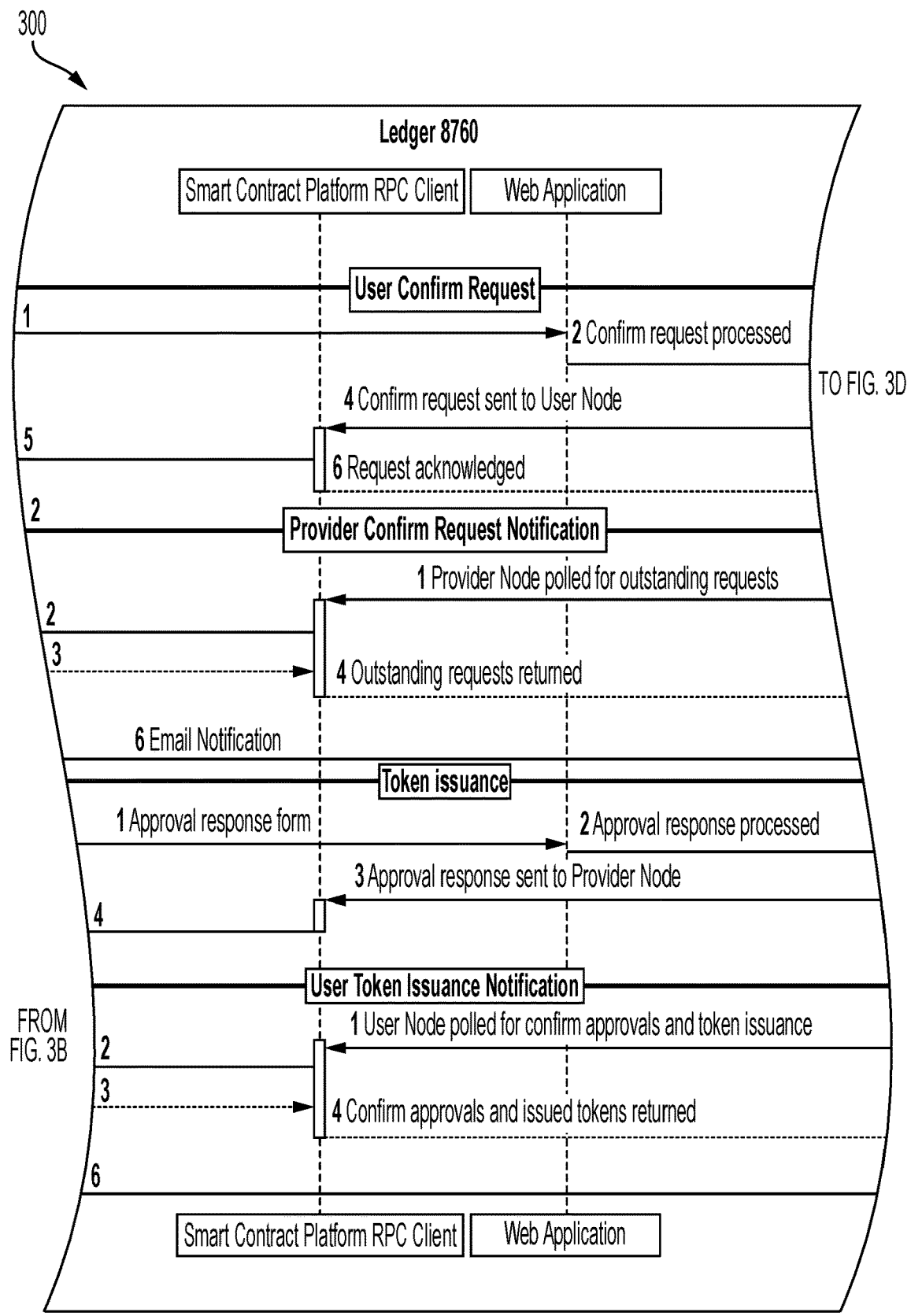
Figure 3D:
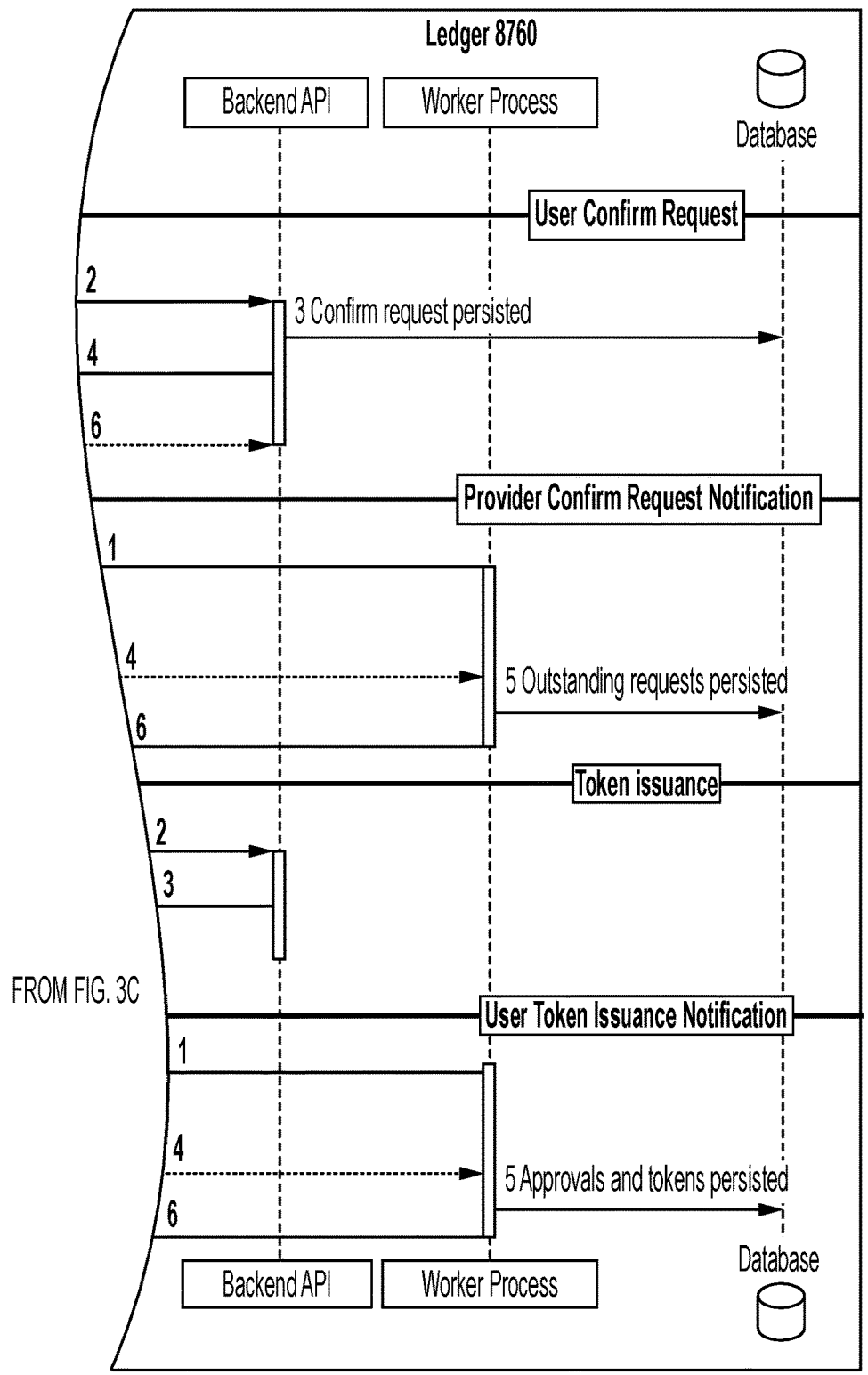

FIG. 2 depicts an example platform 200 provided by the described energy contracting system. The example platform 200 includes a dashboard, an oracle service, and a network mapping service. As depicted, the network mapping service includes a notary service for a seller and a buyer of, for example, energy. The buyer and seller may enter into a bilateral contract that is manger through embodiments of the described energy contracting system. As depicted, the example platform 200 includes a firewall access control to provide access to premising service.

In some embodiments, the example platform 200 integrates operational information with market and grid data, backed by a distributed contract management system, to allow participation in energy markets. In some embodiments, the example platform 200, also provides powerful data and management tools. Participants on the Ledger platform experience a streamlined integration between facility, market, and grid, enabling access to a deep and holistic dataset. In some embodiments, users can choose between several hosting options providing various degrees of data control and independence. Moreover, the distributed nature of the example platform 200 coupled with the use of cryptographic techniques ensures that transaction data remains private yet fully auditable through a chain of custody.

In some embodiments, the example platform 200 provides tokens that undergo a lifecycle that begins with the creation of firm obligations, and are updated continuously to account for financial transactions, physical delivery, market conditions, and other events that occur between the token's creation and ultimate retirement. The example platform 200 ensures that all parties involved in a contract have cryptographic assurance about the latest contract state and can independently audit all previous state transitions (e.g., contract changes and updates). In some embodiments, the example platform 200 does not require a unified system state; it creates a shared "truth" between counterparties that have, or have had, privity to each tokenized transaction. This approach offers several advantages in terms of resource requirements, scalability, and privacy compared to traditional full-stack blockchain models. A cryptographically secure dispute resolution system allows users to tracs and financially resolve divergence between financial energy transactions, physical grid events, and end use at customer facilities.

Figure 7B:
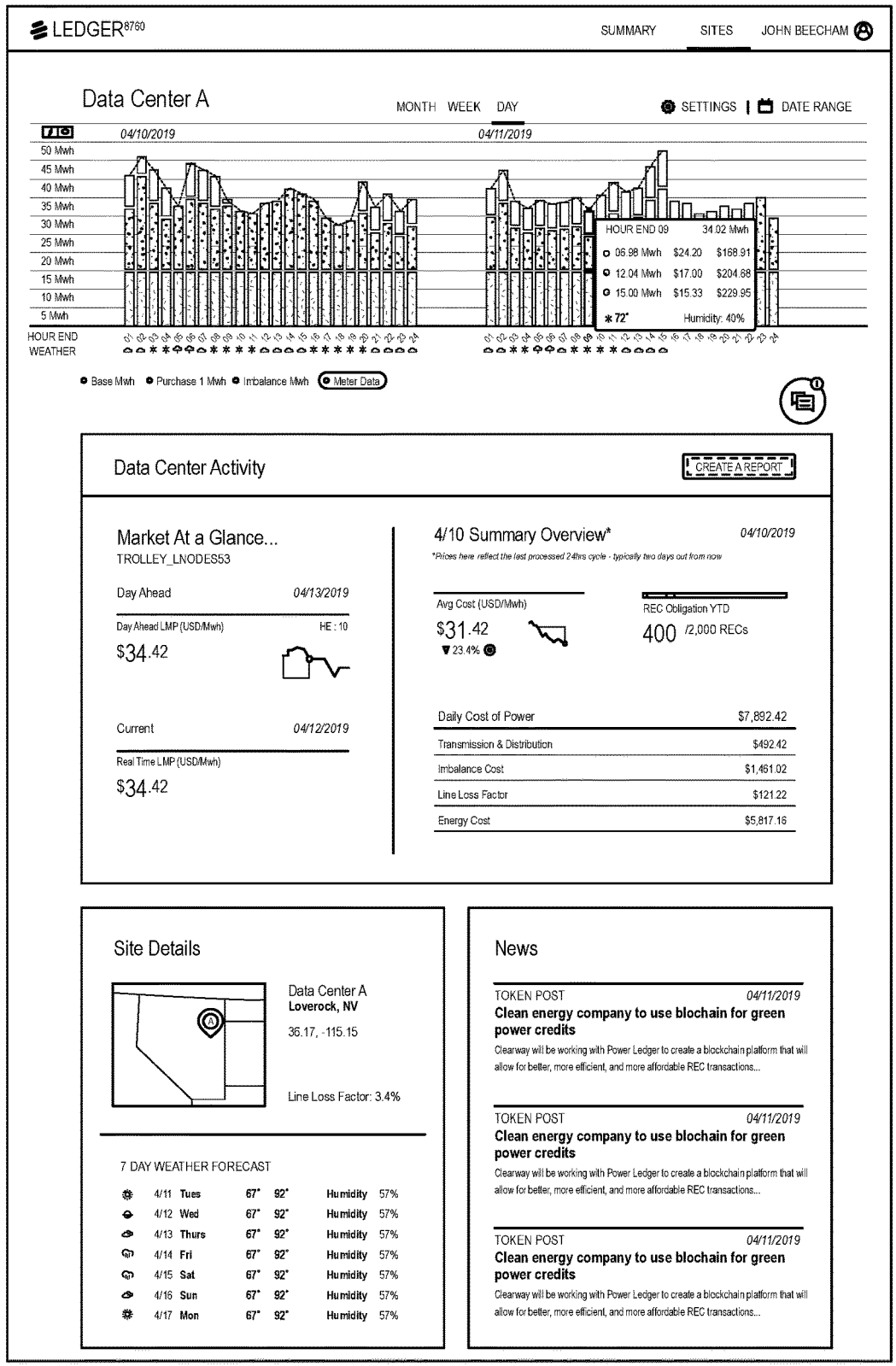
Figure 7C:

In some embodiments, the example platform 200 provides a dashboard through which clients may access their data and contract information (see FIGS. 7A-7C for example screens from the dashboard). In some embodiments, the provided dashboard is a "Bloomberg Terminal" for energy integrates real time market inputs and events with customer and provider facilities. In some embodiments, the provided dashboard integrates real time market information with customer facility data and then maps it on the process of energy forecasting, purchasing, usage, billing and reconciliation. In some embodiments, the provided dashboard provides unique curated energy news feed, unique real-time imbalance calculation, and proprietary reporting function.

In some embodiments, the dashboard provides information about a client's site, a client's tokens, and the energy markets. In some embodiments, the dashboard includes an interface to build and manage contracts. In some embodiments, the dashboard pulls together publicly available and proprietary data to provide information and accessibility to data regarding, for example, the electrical system (e.g., a facility's electrical use, electricity providers). In some embodiments, data regarding other commodity forms (e.g., natural gas, oil, non-energy attributes of renewables (carbon offset, carbon credits, or renewable energy credits) is provided through the dashboard. In some embodiments, the dashboard provides monitors regarding the integration (e.g., send/received) of an end user facility with the energy grid. In some embodiments, the dashboard provides a client information regarding financial markets that operate within the energy world.

In some embodiments, the dashboard integrates three major domains: 1) Real-time energy markets and the financial world of the energy system; 2) The physical flows on the energy/electrical grid; and 3) The operations and usage of the customers' facilities.

In some embodiments, the dashboard is a user-friendly and intuitive set of tools that allows the user to see the current state in real-time of, for example, a facility as data is being produced by, for example, electric meters associated with the facility. In some embodiments, the dashboard provides a real-time hour-by-hour look at what a facility is using. For example, the dashboard may show: usage (e.g., a comparison of energy usage versus energy ordered); areas where energy was used more and/or less than what was ordered; and updates, in real-time, of costs (e.g., by drawing from tokens representing each megawatt hours being used and real-time market data for any energy that is used that is over or under an obligation). In some embodiments, the dashboard provides real time market data that includes, for example, energy costs for a particular hour at a particular location. In some embodiments, the dashboard provides day ahead data in the day ahead market to show projections determined according energy projection data provided by the energy and balance market. Such energy projection data may include, for example, projection for each hour on a particular day (e.g., tomorrow). In some embodiments, the dashboard provides information regarding the last resolved day. This day may be, for example 24 hours behind. In some embodiments, clients may employ the dashboard to look at data from further back in time by clicking through to the token view. For example, a client may view the amount of energy that is reserved for the future and the pricing at which the energy is reserved. In some embodiments, the dashboard provides assistance to clients with decisions regarding additional confirms the client may want to put in place for future hours. In some embodiments, the dashboard provides a newsfeed that curates, for example, energy news. In some embodiments, the dashboard provides an integrated chat function to allow clients to talk to providers. In some embodiments, the dashboard provides generates reports regarding old data (yesterday, last week, last month, and so forth. In some embodiments, the dashboard may also integrate weather (e.g., the temperature per hour and humidity). Such weather data may be used to aid facility (e.g., data center) operators in understanding future energy needs.

In some embodiments, the example platform 200 provides a distributed contract management system using specific blockchain-based components and design patterns. In some embodiments, the example platform 200 provides, for example, public key cryptography for user authentication; digital signatures for authorizing contract changes, updates, and other actions; cryptographic hashing functions for integrity checks; append-only logs to enable fully-auditable chains of custody; point-to-point communication for efficient data sharing and privacy; and customizable consensus options to reduce the influence of the platform operator.

In some embodiments, the described system allows for tokenizing via blockchain based token theory to describe "Confirms". In some embodiments, a Confirm includes a set of obligations that arises when parties enter into energy contracts or energy sales. In some embodiments, a Confirm includes a document that is subject to a master agreement and happens when parties agree and sign for the delivery and payment of a set of energy (e.g., a first set of megawatt hours). In some embodiments, the contracts are bigger than the Confirm because the tokens are tied to individual Confirms. In the simplest example, the party on one side of a Confirm is responsible for consuming the energy (e.g., a data center) while the party on other side is responsible for providing the energy (e.g., a refinery role). In some embodiments, roles are shared among multiple parties (e.g., nodes).

In some embodiments, obligations that may be captured by a Confirm comprise both 1) financial obligations (e.g., a promise to pay a certain amount in the future when energy is delivered), and 2) physical obligations (e.g., a promise to deliver an amount of energy to a place). In some embodiments, a token is "born" when a set of obligations arises contractually (financial on one side, physical on the other). In some embodiments, a token comprises one megawatt hour or any range between zero megawatt hours and one megawatt hour. In some embodiments, token comprise a token state.

In some embodiments, a token state reflects changes, such as pricing changes due to real-time markets adjustments, quantity change based on the actual consumption at the time of consumption or actual production at the time of production, delivery cost changes due to congestion in the real grid, which changes the ability of the grid to deliver precisely the energy that was contracted for, and so forth. In some embodiments, tokens capture data reflecting how the real-world changes. For example, tokens capture data regarding the financial and physical obligations that the token represents, all the way and up to final payment and resolution of the token at the end, which includes the true up period after billing and payment has already taken place.

In some embodiments, the token is a bridge to the blockchain driven contract management and market. For example, Company A wants 50 megawatt hours of energy every hour tomorrow. A Confirm is signed. The system would then generate tokens to represent the agreement (e.g., 50 tokens for each of the 24 hours for that day). As another example, a base/standard confirm includes (because a client wants, for example, a flat hedge for their futures) a facility's average of 20 megawatts with a floor consumption of 10 megawatts. For the best pricing, the facility owner may lock in 10 megawatts every hour of every day, 8760 hours per year for the next five years. When that Confirm is signed, the system creates 10 times 8760 times 5 years' worth of tokens. Additional Confirms can be used to fill in the delta between the already procured 10 megawatts and the 20 that are used on average.

In some embodiments, transmission curtailment occurs when there is a disruption in the desired or the planned and paid for path of energy to the user. Transmission curtailment can happen for many reasons. For example, various priced electricity may be provided at the time of the curtailment. In such an example, if the energy is not delivered (i.e., if it is curtailed), then energy that covers the obligation that a provider failed to meet when the energy did not arrive will be provided at a cover price. This "cover" will be priced according to real-time market pricing. In such a scenario, the described energy contracting system can update tokens with real-time pricing to document the price when the cover energy is delivered.

In some embodiments, the described energy contracting system allows, through the curtailment wizard (see FIG. 7A) for dispute resolution using the tokens and the data gathered by the dashboard to, for example, identify likely sources of the curtailment and reprice affected tokens correctly. In some embodiments, the described energy contracting system provides for the tracking and identification of the most likely source of a disruption as well as any tokens that are would have been affected by that disruption. As a result, the system can match the cover price for the liquidated damages to the price that was associated with the tokens that were actually curtailed.

In some embodiments, the described energy contracting system provides a dispute resolution system where a provider and customer can use the dashboard to send their proposed resolutions to one another. Once an agreement has been reached, the resolution can be imported to a blockchain where it is recorded and becomes a two block change issue.

In some embodiments, the provided blockchain driven contract management has no single system state as the parties are provided a system for the development of contracts amongst themselves. As such, Confirms can be subject to a master agreement that does not change and are thus relatively similar. In some embodiments, there is a shared state between each node that are assigned to a party to a transaction. For example, when a client is a party to a token and has an obligation related to that token, then that party's node and the nodes of every other party who is privy to the token maintain a shared state as to that Confirm and the tokens associated with that Confirm. To state this another way, the nodes are parties to the Confirm and these nodes keep the state of the Confirm. In some embodiments, other nodes not privy to the Conform have no idea of the Confirm's existence. As such, in some embodiments, the system facilitates the generation of miniature blockchains with no single true blockchain. These miniature blockchain are between only the parties that are privy to the Confirm. This solution helps to maintain confidentiality among the parties to a Confirm. In some embodiments, an agreed to confirm is signed by the parties and sent to the system and then on to the blockchain, which provides a cryptographic record of what the parties have agreed to. The contract state can then be updated on the blockchain through the respective nodes assigned to each party.

In some embodiments, the dashboard is the nexus to a token as the underlying logic of the described energy contracting system includes the contracting that exist among the nodes that is facilitated through the blockchain structured so that each customer has an individual node. In some embodiments, nodes have no nexus to the system (other than they agree to abide by the logic and rules set as administered by the system). For example, the ledger (e.g., blockchain) is a gatekeeper for the ecosystem and sets the rules and the logic on which the nodes operate.

In some embodiments, clients are provided their own dashboards that connect to the ecosystem and to their node. In some embodiments, contracts on the dashboard are stored and managed on the blockchain network. In some embodiments, clients can view their Confirms and respective tokens, which are being tracked in the interactions between their node and other nodes, counterparty nodes.

In some embodiments, the provided network is run by a network operator. For example, a network operator may provide access control, sets rules, and grant access to the network. For a new client (e.g., a new energy manager or facility), the network operator can create a node, and grant the client access to that node. In some embodiments, the network operator does not have access to the ledger that is shared between the nodes that are managing a Confirm. In some embodiments, the network operator operates as a notary service to maintain consensus between the nodes.

In some embodiments, the example platform 200 provides a contracting wizard. In some embodiments, the example platform 200 provides standardized contract templates through the contracting wizard. Such standardized contract templates enable, for example, the full automation of inter-organizational workflows by directly encoding rights and obligations into the contracts themselves, which remain fully auditable by any participant involved in a given trade. In some embodiments, information is only shared on a "need-to-know" basis between counterparties involved in a trade. This approach reduces storage and bandwidth requirements while also providing greater privacy to transaction parties. The flexibility of the example platform 200 allows participants to choose from a range of hosting options that provide various degrees of independence and self-control. For example, users can adapt to changing circumstances by seamlessly switching between different options. The example platform 200 access may be managed by a third-party; however, third-party entities can be provided the opportunity to join the network and offer additional services (e.g. node-as-a-service, notary-as-a-service, etc.) to reduce reliance on a single operator and increase network resilience and robustness.

In some embodiments, the example platform 200 provides a standard master agreement that parties can use or that parties can modify. Such a standard master agreement allows parties to quickly and seamlessly offer (e.g., through the dashboard) proposed terms regarding energy purchase or sale. In some embodiments, the dashboard may include click through and tick boxes to allows parties to go back and forth and negotiate as they like. In some embodiment, parties may send messages back and forth. In some embodiment, tokens can be generated or updated and associated with the agreed upon confirm subject to verification.

Example Processes

For clarity of presentation, the description that follows generally describes the example processes 300, 400, and 420 in the context of FIGS. 1A-2, and 5-7C. However, it will be understood that the processes 300, 400, and 420 may be performed, for example, by any other suitable system, environment, software, and hardware, or a combination of systems, environments, software, and hardware as appropriate. In some embodiments, various operations of the processes 300, 400, and 420 can be run in parallel, in combination, in loops, or in any order.

FIGS. 3A-3D depicts a process 300 for a confirm request cycle built around a token(s). The process 300 generally depicts how an energy user and an energy provided interact with the provided system to generate and persist an agreed to Confirm between the parties.

Figure 4A:
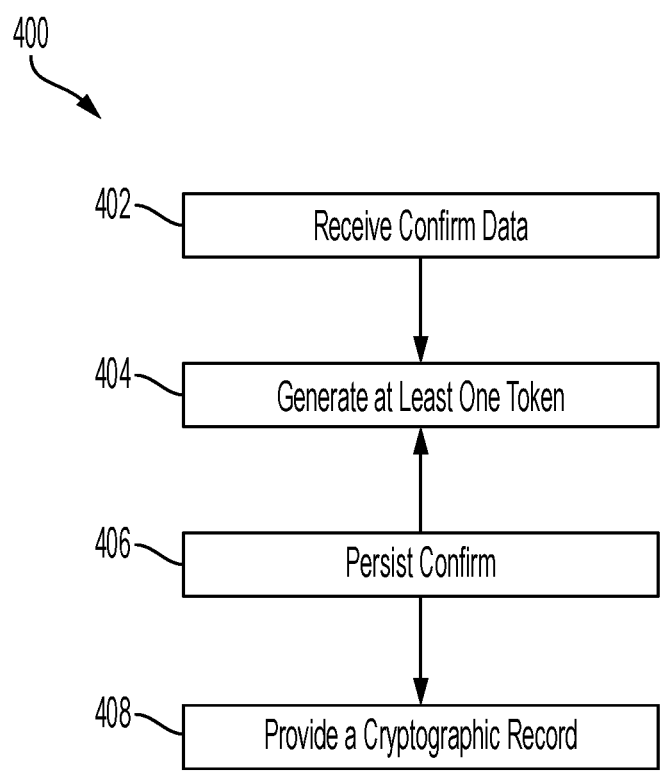
FIGS. 4A and 4B depict flowcharts of non-limiting examples processes that can be implemented by embodiments of the present disclosure.

FIG. 4A depicts a flowchart of an example process 400 that can be implemented by embodiments of the present disclosure. The example process 400 generally shows in more detail how a cryptographic record of an energy contract persisted as a confirm to a distributed ledger.

At 402, confirm data is received. The confirm data includes a plurality of obligations arising from an energy contract entered into by at least two parties. The obligations include physical obligations for an amount of energy and financial obligations for the amount of energy. In some embodiments, the physical obligations comprise delivery of the amount of energy to a facility associated, or a point nominated by, with at least one of the parties. In some embodiments, the financial obligations comprise a payment amount for the amount of energy. In some embodiments, the amount of energy includes a first set of megawatt hours. In some embodiments, the energy contract is signed by the at least two parties. From 402, the process 400 proceeds to 404.

At 404, at least one token based on the obligations is generated. Each token includes a token state and a range for a unit for measuring the amount of energy. In some embodiments, the unit for measuring the amount of energy comprises a megawatt hour. In some embodiments, the range is between and including zero megawatt hours and one megawatt hour. In some embodiments, each token state reflects changes that includes pricing changes, quantity changes, changes in delivery cost, changes in a physical obligation, source of the energy, renewable attributes, or carbon content of the energy or resolution of the respective token. In some embodiments, the pricing changes are due to due to markets adjustments. In some embodiments, the quantity changes include actual consumption at a time of consumption or actual production at a time of production. In some embodiments, changes to the token state are persisted to a distributed ledger. In some embodiments, each token state is updated in real-time according to real-time markets for any energy that is being used that is over or under the at least one of the obligations. From 404, the process 400 proceeds to 406.

At 406, a confirm is persisted to the distributed ledger. The confirm is generated based on the confirm data and the at least one token. In some embodiments, the confirm is subject to a master services agreement. In some embodiments, the distributed ledger comprises a blockchain. In some embodiments, in the blockchain is accessible by only the parties. From 406, the process 400 proceeds to 408.

At 408, a cryptographic record of the energy contract is provided to each of the parties according to the confirm and the at least one token state. In some embodiments, curtailment data regarding the confirm is received, the at least one token is repriced according to the curtailment data, and dispute resolution is provided to the parties based on the repriced at least one token. In some embodiments, the at least one token is repriced by identifying a most likely source of a disruption and the at least one token that would have been affected by the disruption. In some embodiments, a cover price for liquidated damages is matched to a price that was associated with the at least one token that were actually curtailed. In some embodiments, the cryptographic record comprises resolution data for any previous day. In some embodiments, the cryptographic record comprises an amount energy reserved for the future and a pricing at which the future amount of energy is reserved. In some embodiments, information regarding additional confirms to put in place for future hours is provided to at least one of the parties. In some embodiments, the information determined based on the cryptographic record. From 408, the process 400 ends.

Figure 4B:
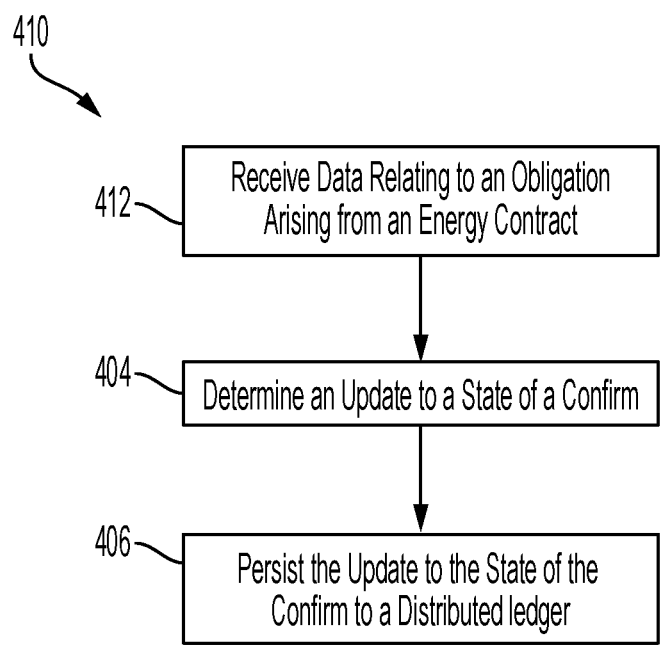

FIG. 4B depicts a flowchart of an example process 410 that can be implemented by embodiments of the present disclosure. The example process 400 generally shows in more detail or how a stated of a confirm between a plurality of nodes each privy to the confirm is maintained through a distributed ledger.

At 412, data relating to an obligation arising from an energy contract entered into by a plurality of parties is received. In some embodiments, the energy contract comprises two parties. In some embodiments, the energy contract comprises more than two parties. In some embodiments, the obligation is associated with at least one of the parties to the energy contract. In some embodiments, the obligation comprises a physical obligation for an amount of energy or a financial obligation for the amount of energy. In some embodiments, the obligation is associated with a token assigned to the confirm. In some embodiments, each token comprises a token state and a range for a unit for measuring the amount of energy. In some embodiments, the unit for measuring the amount of energy comprises a megawatt hour. In some embodiments, the range is between and including zero megawatt hours and one megawatt hour. From 412, the process 410 proceeds to 414.

At 404, an update to a state of a confirm is determined based on the received data. The confirm is stored to a distributed ledger and provides a cryptographic record of the energy contract among the parties. In some embodiments, the confirm is signed by the parties. In some embodiments, the distributed ledger comprises a blockchain. In some embodiments, the blockchain is accessible by only the nodes. From 414, the process 410 proceeds to 416.

At 416, a confirm is persisted to a distributed ledger. The update to the state of the confirm is persisted to the distributed ledger to maintain a shared state of the confirm between a plurality of nodes. In some embodiments, each node is associated with a respective party to the energy contract. In some embodiments, at least one other node is associated with a party with no privity to the energy contract. In some embodiments, the other node has no access to the confirm or the distributed ledger. In some embodiments, each of the nodes is privy to the token and has at least one obligation related to the token. In some embodiments, a network operator provides access control, and sets rules, for the nodes. In some embodiments, the network operator does not have access to the distributed ledger shared between the nodes. In some embodiments, the nodes communicate with one another and not with the network operator to maintain the shared state of the confirm. In some embodiments, the network operator generates new nodes for each party to a newly received energy contract. In some embodiments, the network operator acts as a notary service to maintain consensus between the nodes. In some embodiments, the nodes access the distributed ledger and the confirm through a dashboard. In some embodiments, the dashboard: receives energy consumption data for a facility associated with at least one of the parties or provider data regarding a physical flow from a provider facility associated with at least one of the parties to the facility via an energy grid; and provides, to the nodes, the received energy consumption data or the provider data as the data relating to the obligation. In some embodiments, the energy consumption data is regarding electricity consumption, natural gas consumption, oil consumption, or non-energy attributes of renewables. In some embodiments, the non-energy attributes of renewables include carbon offset, carbon credits, or renewable energy credits. In some embodiments, the energy consumption data is received from electric meters associated with the facility. In some embodiments, the dashboard provides, to each of the nodes, access in real-time to energy markets. In some embodiments, the data accessed in real-time from the energy markets includes energy costs for a particular hour at a particular location. From 416, the process 410 ends.

Processing Devices and Processors

In some embodiments, the platforms, systems, media, and methods described herein include a computer, or use of the same. In further embodiments, the computer includes one or more hardware CPUs or general purpose graphics processing units (GPGPUs) that carry out the device's functions. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computer includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage or memory device. The storage or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc read-only memory (CD-ROM), digital versatile disc (DVD), flash memory devices, magnetic disk drives, magnetic tapes drives, optical disk drives, and cloud computing-based storage. In further embodiments, the storage and/or memory device is a combination of devices such as those disclosed herein.

In some embodiments, the computer includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In some embodiments, the computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 5:
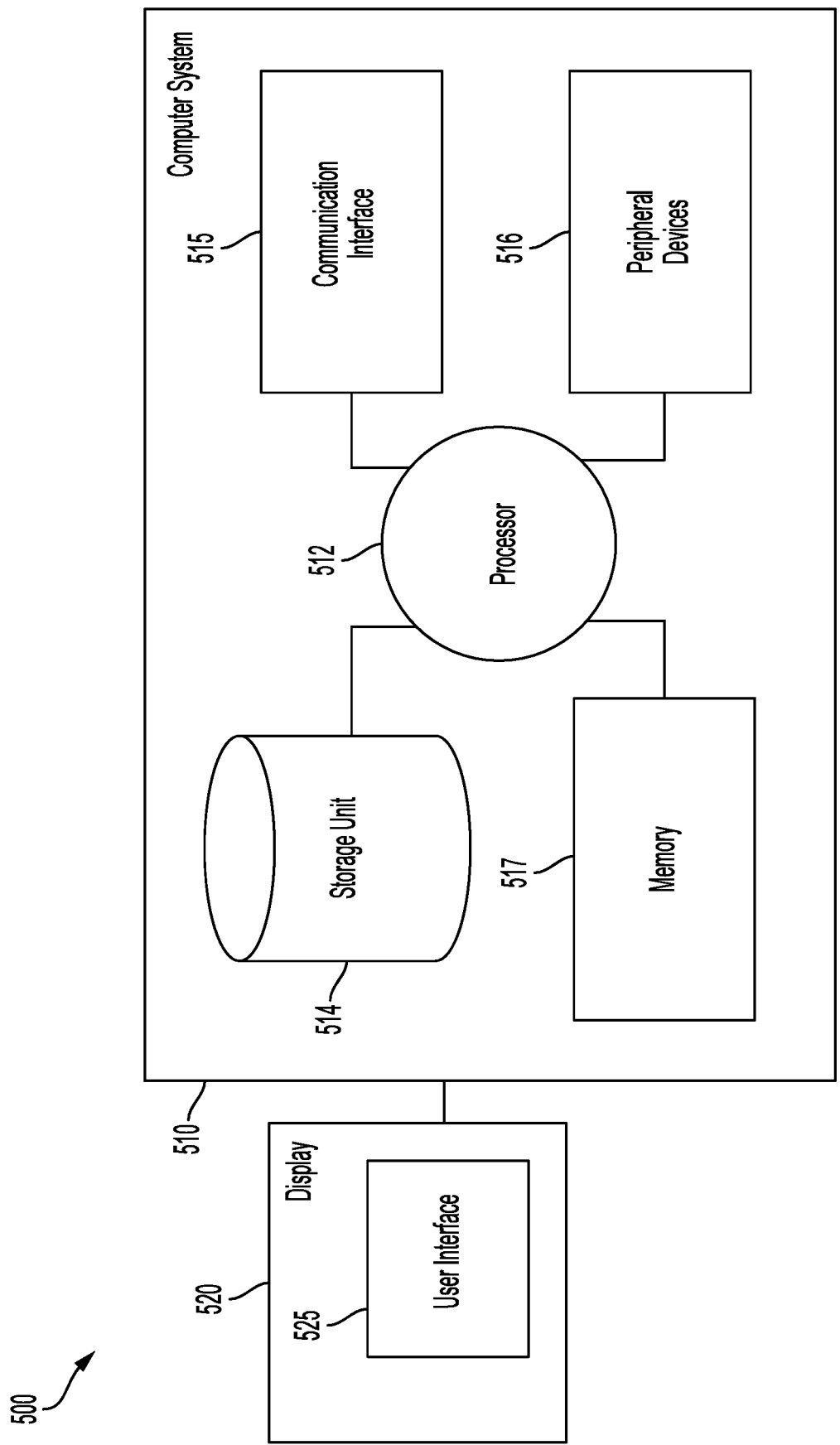
FIG. 5 depicts a non-limiting example a computer system that can be programmed or otherwise configured to implement methods or systems of the present disclosure.

Computer control systems are provided herein that can be used to implement the platforms, systems, media, and methods of the disclosure. FIG. 5 depicts an example a computer system 510 that can be programmed or otherwise configured to implement platforms, systems, media, and methods of the present disclosure. For example, the computing device 510 can be programmed or otherwise configured to provide a platform, such as described above.

In the depicted embodiment, the computing device 510 includes a CPU (also "processor" and "computer processor" herein) 512, which is optionally a single core, a multi core processor, or a plurality of processors for parallel processing. The computing device 510 also includes memory or memory location 517 (e.g., random-access memory, read-only memory, flash memory), electronic storage unit 514 (e.g., hard disk), communication interface 515 (e.g., a network adapter) for communicating with one or more other systems, and peripheral devices 516, such as cache, other memory, data storage and/or electronic display adapters. In some embodiments, the memory 517, storage unit 514, interface 515 and peripheral devices 516 are in communication with the CPU 512 through a communication bus (solid lines), such as a motherboard. The storage unit 514 comprises a data storage unit (or data repository) for storing data. The computing device 510 is optionally operatively coupled to a computer network, such as the network 610 depicted and described in FIG. 6A, with the aid of the communication interface 515. In some embodiments, the computing device 510 is configured as a back-end server deployed within the described energy contracting system.

In some embodiments, the CPU 512 can execute a sequence of machine-readable instructions, which can be embodied in a program or software. The instructions may be stored in a memory location, such as the memory 517. The instructions can be directed to the CPU 512, which can subsequently program or otherwise configure the CPU 512 to implement methods of the present disclosure. Examples of operations performed by the CPU 512 can include fetch, decode, execute, and write back. In some embodiments, the CPU 512 is part of a circuit, such as an integrated circuit. One or more other components of the computing device 510 can be optionally included in the circuit. In some embodiments, the circuit is an application specific integrated circuit (ASIC) or a FPGA.

In some embodiments, the storage unit 514 stores files, such as drivers, libraries and saved programs. In some embodiments, the storage unit 514 stores user data, e.g., user preferences and user programs. In some embodiments, the computing device 510 includes one or more additional data storage units that are external, such as located on a remote server that is in communication through an intranet or the internet.

In some embodiments, the computing device 510 communicates with one or more remote computer systems through a network. For instance, the computing device 510 can communicate with a remote computer system. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 510 via a network.

In some embodiments, the platforms, systems, media, and methods as described herein are implemented by way of machine (e.g., computer processor) executable code stored on an electronic storage location of the computing device 510, such as, for example, on the memory 517 or the electronic storage unit 514. In some embodiments, the CPU 512 is adapted to execute the code. In some embodiments, the machine executable or machine-readable code is provided in the form of software. In some embodiments, during use, the code is executed by the CPU 512. In some embodiments, the code is retrieved from the storage unit 514 and stored on the memory 517 for ready access by the CPU 512. In some situations, the electronic storage unit 514 is precluded, and machine-executable instructions are stored on the memory 517. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 510 can include or be in communication with an electronic display 520. In some embodiments, the electronic display 520 provides a UI 525 that depicts various screen such as the examples depicted in FIGS. 7A-7C.

Figure 6A:
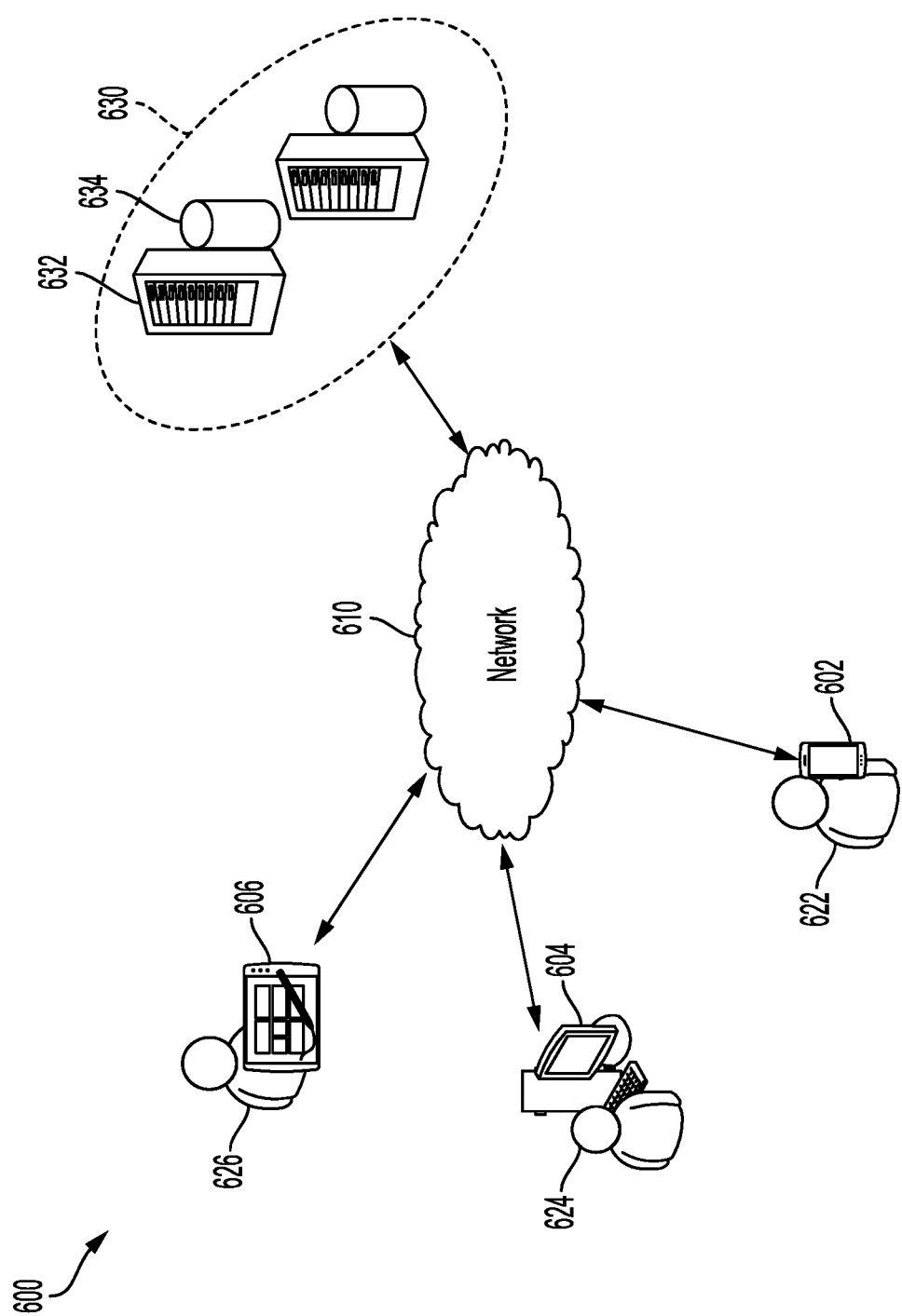
FIG. 6A depicts a non-limiting example environment that can be employed to execute embodiments of the present disclosure.

FIG. 6A depicts an example environment 600 that can be employed to execute embodiments of the present disclosure. The example system 600 includes computing devices 602, 604, 606, a back-end system 630, and a network 610. In some embodiments, the network 610 includes a local area network (LAN), wide area network (WAN), the Internet, or a combination thereof, and connects web sites, devices (e.g., the computing devices 602, 604, and 606) and back-end systems (e.g., the back-end system 630). In some embodiments, the network 610 includes the Internet, an intranet, an extranet, or an intranet and/or extranet that is in communication with the Internet. In some embodiments, the network 610 includes a telecommunication or a data network. In some embodiments, the network 610 can be accessed over a wired or a wireless communications link. For example, mobile computing devices (e.g., the smartphone device 602 and the tablet device 606), can use a cellular network to access the network 610.

The described energy contracting system may be employed within the example environment 600 to, for example, provide access to energy Confirm among parties privy to the Confirm. In some examples, the users 622, 624, and 626 interact with the described system through a graphical user interface (GUI), such as depicted in FIGS. 7A-7C, or application that is installed and executing on their respective computing devices 602, 604, and 606. In some examples, the computing devices 602, 604, and 606 provide viewing data to screens with which the users 622, 624, and 626, can interact. In some embodiments, the computing devices 602, 604, 606 are sustainably similar to computing device 510 depicted in FIG. 5. The computing devices 602, 604, 606 may each include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. Three user computing devices 602, 604, and 606 are depicted in FIG. 6A for simplicity. In the depicted example environment 600, the computing device 602 is depicted as a smartphone, the computing device 604 is depicted as a tablet-computing device, and the computing device 606 is depicted a desktop computing device. It is contemplated, however, that embodiments of the present disclosure can be realized with any of the appropriate computing devices, such as those mentioned previously. Moreover, embodiments of the present disclosure can employ any number of devices as required.

In the depicted example environment 600, the back-end system 630 includes at least one server device 632 and at least one data store 634. In some embodiments, the device 632 is sustainably similar to computing device 510 depicted in FIG. 5. In some embodiments, the back-end system 630 may include server-class hardware type devices. In some embodiments, the server device 632 is a server-class hardware type device. In some embodiments, the back-end system 630 includes computer systems using clustered computers and components to act as a single pool of seamless resources when accessed through the network 610. For example, such embodiments may be used in data center, cloud computing, storage area network (SAN), and network attached storage (NAS) applications. In some embodiments, the back-end system 630 is deployed using a virtual machine(s). In some embodiments, the data store 634 is a repository for persistently storing and managing collections of data. Example data store that may be employed within the described energy contracting system include data repositories, such as a database as well as simpler store types, such as files, emails, and so forth. In some embodiments, the data store 634 includes a database. In some embodiments, a database is a series of bytes or an organized collection of data that is managed by a database management system (DBMS).

In some embodiments, the at least one server system 632 hosts one or more computer-implemented services, such as the above described workspace, provided by the described system that users 622, 624, and 626 can interact with using the respective computing devices 602, 604, and 606.

Figure 6B:
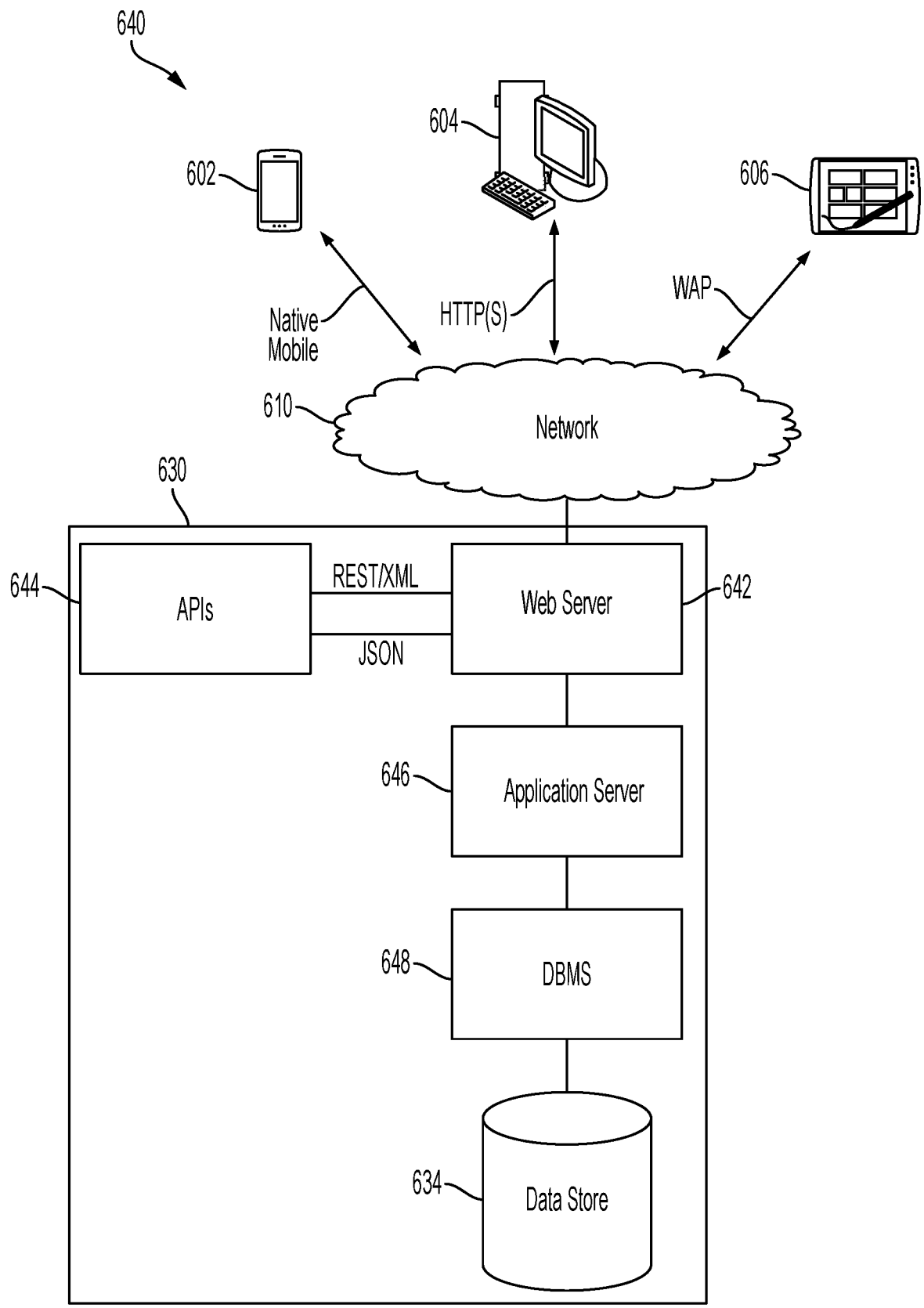
FIG. 6B depicts a non-limiting example application provision system that can be provided through an environment and employed to execute embodiments of the present disclosure.

FIG. 6B depicts an example application provision system 640 that can be provided through an environment, such as the example environment 600 and employed to execute embodiments of the present disclosure. As depicted, the example application provision system 640 includes the back-end system 630 configured to include one or more data stores 634 accessed by a DBMS 648. Suitable DBMSs include Firebird, MySQL, PostgreSQL, SQLite, Oracle Database, Microsoft SQL Server, IBM DB2, IBM Informix, SAP Sybase, SAP Sybase, Teradata, and the like. As depicted, the example application provision system 640 includes the back-end system 630 configured to include one or more application severs 646 (such as Java servers, .NET servers, PHP servers, and the like) and one or more web servers 642 (such as Apache, IIS, GWS and the like). The web server(s) 642 optionally expose one or more web services via an API 644 via the network 610. In some embodiments, the example application provision system 640 provides browser-based or mobile native UIs to the computing devices 602, 604, 606.

Figure 6C:
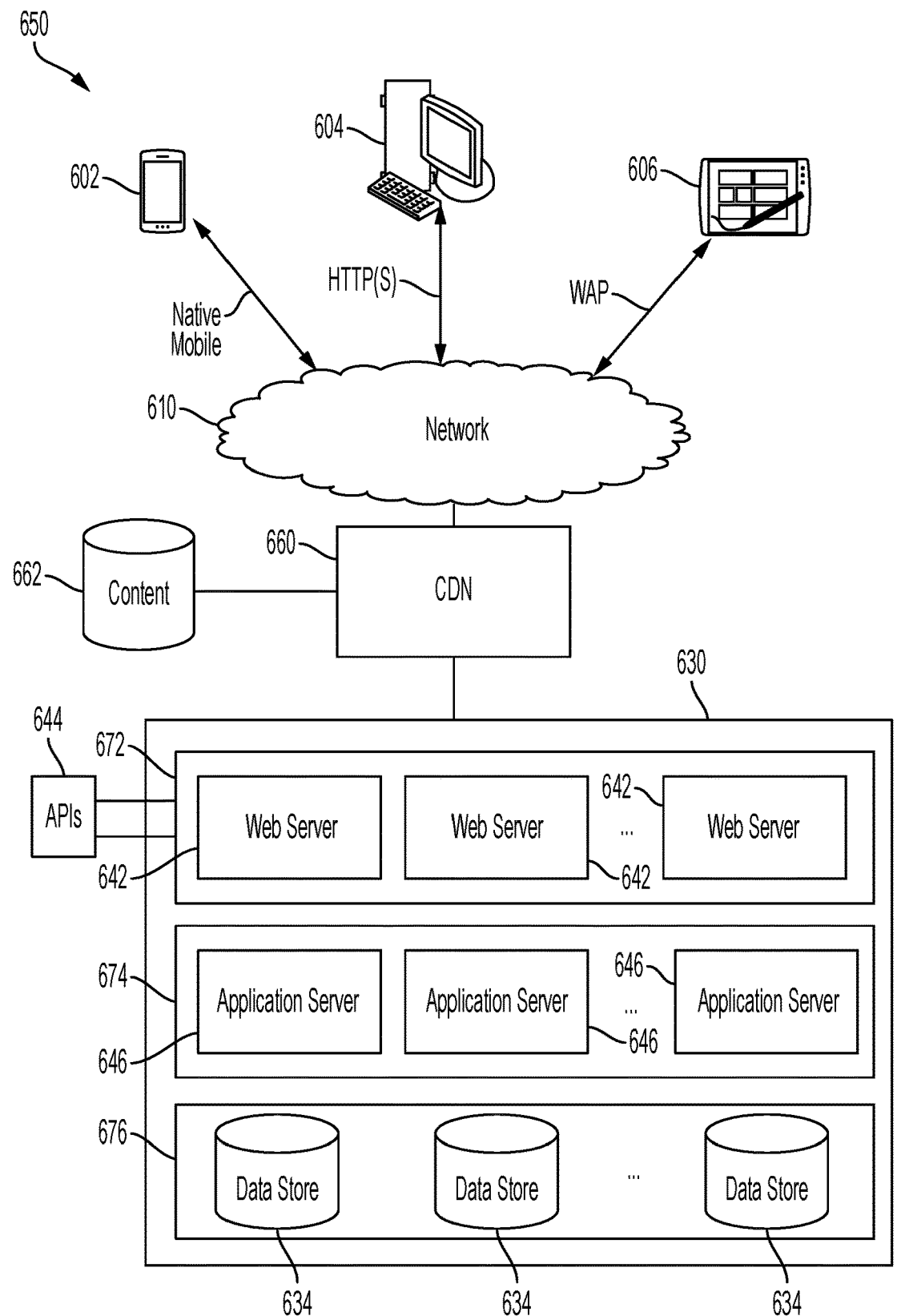
FIG. 6C depicts a non-limiting example cloud-based architecture of an application provision system that can be provided through an environment and employed to execute embodiments of the present disclosure.

FIG. 6C depicts an example cloud-based architecture of an application provision system 650 that can be provided through an environment, such as the example environment 600, and employed to execute embodiments of the present disclosure. The application provision system 650 includes the back-end system 630 configured to include elastically load balanced, auto-scaling web server resources 672, application server resources 674, as well as synchronously replicated stores 676. In some embodiment, of the example cloud-based architecture of an application provision system 650, content 662 of services are provided through a content delivery network (CDN) 660 coupled with the back-end system 630. In some embodiments, a CDN is a geographically distributed network of proxy servers and respective data centers that provides high availability and high performance through distributing the service spatially relative to the receiving devices, such as commuting devices 602, 604, and 606.

Dashboard Example Pages

FIGS. 7A-7C depict various example pages provide in the dashboard provided by the described system.

FIG. 7A depicts an example curtailment wizard page 700. The example curtailment wizard page 700 includes the function of the dispute resolution mechanism that uses data acquired by the Dashboard regarding the physical state of the grid during those hours in which congestion prevented the planned and scheduled delivery of contracted power to the point of delivery and presents to the counterparties the range of options for calculating liquidated damages (LDs), and assigning such LDs, as between the parties. In some embodiments, the Dashboard calculates the cost of cover based on master agreement terms, location and real time hourly prices and recommends the solution that most closely matches the known data. The parties may adjust responsibility or calculation of LDs and recommend an alternative resolution in an iterative manner. In some embodiments, once both parties have accepted a resolution, the Token state is updated, and electronic signatures appended to the Blockchain.

FIG. 7B depicts an example site overview page 710. The site overview page 710 includes a depiction of the home page of the customer-side dashboard terminal, displaying at the top of the page real time and historical performance derived from facility electrical meter data, real time market pricing, contract pricing, and physical grid performance during each hour. In addition, "at a glance" provides basic market conditions, and summary overview displays the financial and physical performance for the most recently resolved day, and permits downloading of a .pdf file with a full performance report. Finally, information regarding the displayed facility is displayed on the bottom left, and a curated news feed is presented on the bottom right.

FIG. 7C depicts an example token view page 720. The example token view page 720 includes details for megawatt hours associated with a facility during a given hour. In some embodiments, the data regarding each megawatt hour is provided through an oracle function to the nodes associated with each confirm that governs delivery of power to the facility during that hour.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to provided information to users with the provided workspaces Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received contextual data may be employed to train various algorithms. Moreover, as described above, these algorithms can be continuously trained/retrained using real-time user data as it is received. In some embodiments, the machine learning algorithm employs regression modelling where relationships between variables are determined and weighted. In some embodiments, the machine learning algorithm employ regression modelling, wherein relationships between predictor variables and dependent variables are determined and weighted.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS).

In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in one or more languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process (e.g., not a plug-in). Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and so forth. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In some embodiments, a database is cloud computing-based. In some embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented method for providing a cryptographic record of an energy contract persisted as a confirm to a distributed ledger, the method being executed by one or more processors and comprising:
    receiving confirm data comprising a plurality of obligations arising from the energy contract entered into by at least two parties, wherein the obligations comprise physical obligations for an amount of energy and financial obligations for the amount of energy;
    generating at least one token based on the obligations, wherein each token comprises a token state and a range for a unit for measuring the amount of energy;
    persisting the confirm to the distributed ledger, the confirm generated based on the confirm data and the at least one token; and
    providing the cryptographic record of the energy contract to each of the parties according to the confirm and the at least one token state;
    wherein the energy contract is signed by the at least two parties, wherein the unit for measuring the amount of energy comprises a megawatt hour, and wherein the range is between and including zero megawatt hours and one megawatt hour.

2. The computer-implemented method of claim 1, wherein the confirm is subject to a master services agreement.

3. The computer-implemented method of claim 1, wherein the physical obligations comprise delivery of the amount of energy to a facility associated, or a point nominated by, with at least one of the parties.

4. The computer-implemented method of claim 1, wherein each token state reflects changes that includes pricing changes, quantity changes, changes in delivery cost, changes in at least one of the physical obligations, source of the amount of energy, renewable attributes, or carbon content of the amount of energy or resolution of the respective token.

5. The computer-implemented method of claim 4, wherein changes to the token state are persisted to the distributed ledger.

6. The computer-implemented method of claim 1, wherein each token state is updated in real-time according to real-time markets for any energy that is being used that is over or under the at least one of the obligations.

7. The computer-implemented method of claim 1, wherein the distributed ledger comprises a blockchain, and wherein the blockchain is accessible by only the parties.

8. The computer-implemented method of claim 1, wherein the cryptographic record comprises resolution data for any previous day.

9. The computer-implemented method of claim 1, wherein the cryptographic record comprises an amount energy reserved for the future and a pricing at which the future amount of energy is reserved.

10. The computer-implemented method of claim 1, comprising:
    providing, to at least one of the parties, information regarding additional confirms to put in place for future hours, the information determined based on the cryptographic record.

11. An energy contracting system, comprising:
    a distributed ledger;
    one or more processors; and
    a computer-readable storage device coupled to the one or more processors and having instructions stored thereon which, when executed by the one or more processors, cause the one or more processors to perform operations comprising:
        receiving confirm data comprising a plurality of obligations arising from an energy contract entered into by at least two parties, wherein the obligations comprise physical obligations for an amount of energy and financial obligations for the amount of energy;
        generating at least one token based on the obligations, wherein each token comprises a token state and a range for a unit for measuring the amount of energy;
        persisting a confirm to the distributed ledger, the confirm generated based on the confirm data and the at least one token; and
        providing a cryptographic record of the energy contract to each of the parties according to the confirm and the at least one token state;
        wherein the energy contract is signed by the at least two parties, wherein the unit for measuring the amount of energy comprises a megawatt hour, and wherein the range is between and including zero megawatt hours and one megawatt hour.

12. A computer-implemented method for maintaining, through a distributed ledger, a state of a confirm between a plurality of nodes each privy to the confirm, the method being executed by one or more processors and comprising:
    receiving data relating to an obligation arising from an energy contract entered into by a plurality of parties;
    determining an update to the state of the confirm based on the received data, wherein the confirm is stored to the distributed ledger and provides a cryptographic record of the energy contract among the parties; and
    persisting, to the distributed ledger, the update to the state of the confirm to maintain a shared state of the confirm between the nodes, wherein each node is associated with a respective party to the energy contract, wherein a network operator provides access control, and sets rules, for the nodes, wherein the network operator does not have access to the distributed ledger shared between the nodes, wherein the nodes communicate with one another and not with the network operator to maintain the shared state of the confirm, wherein the network operator generates new nodes for each party to a newly received energy contract, and wherein the network operator acts as a notary service to maintain consensus between the nodes.

13. The computer-implemented method of claim 12, wherein at least one other node is associated with a party with no privity to the energy contract, and wherein the other node has no access to the confirm or the distributed ledger.

14. The computer-implemented method of claim 12, wherein the obligation is associated with at least one of the parties to the energy contract.

15. The computer-implemented method of claim 12, wherein the obligation is associated with a token assigned to the confirm, wherein each of the nodes is privy to the token and has at least one obligation related to the token, and wherein each token comprises a token state and a range for a unit for measuring the amount of energy.

16. The computer-implemented method of claim 12, wherein the nodes access the distributed ledger and the confirm through a dashboard, wherein the dashboard:
    receives energy consumption data for a facility associated with at least one of the parties or provider data regarding a physical flow from a provider facility associated with at least one of the parties to the facility via an energy grid; and provides, to the nodes, the received energy consumption data or the provider data as the data relating to the obligation.

17. A computer-implemented method for providing a cryptographic record of an energy contract persisted as a confirm to a distributed ledger, the method being executed by one or more processors and comprising:

receiving confirm data comprising a plurality of obligations arising from the energy contract entered into by at least two parties, wherein the obligations comprise physical obligations for an amount of energy and financial obligations for the amount of energy;

generating at least one token based on the obligations, wherein each token comprises a token state and a range for a unit for measuring the amount of energy;

persisting the confirm to the distributed ledger, the confirm generated based on the confirm data and the at least one token;

providing the cryptographic record of the energy contract to each of the parties according to the confirm and the at least one token state;

receiving curtailment data regarding the confirm;

repricing the at least one token according to the curtailment data; and providing dispute resolution to the parties based on the repriced at least one token.

18. The computer-implemented method of claim 17, wherein the confirm is subject to a master services agreement.

19. The computer-implemented method of claim 17, wherein the physical obligations comprise delivery of the amount of energy to a facility associated, or a point nominated by, with at least one of the parties.

20. The computer-implemented method of claim 17, wherein each token state reflects changes that includes pricing changes, quantity changes, changes in delivery cost, changes in at least one of the physical obligations, source of the amount of energy, renewable attributes, or carbon content of the amount of energy or resolution of the respective token.

21. The computer-implemented method of claim 20, wherein changes to the token state are persisted to the distributed ledger.

22. The computer-implemented method of claim 17, wherein each token state is updated in real-time according to real-time markets for any energy that is being used that is over or under the at least one of the obligations.

23. The computer-implemented method of claim 17, wherein the distributed ledger comprises a blockchain, and wherein the blockchain is accessible by only the parties.

24. The computer-implemented method of claim 17, wherein the at least one token is repriced by identifying a most likely source of a disruption and the at least one token that would have been affected by the disruption, and wherein the method comprises:

matching a cover price for liquidated damages to a price that was associated with the at least one token that were actually curtailed.

25. The computer-implemented method of claim 17, wherein the cryptographic record comprises resolution data for any previous day.

26. The computer-implemented method of claim 17, wherein the cryptographic record comprises an amount energy reserved for the future and a pricing at which the future amount of energy is reserved.

27. The computer-implemented method of claim 17, comprising:

providing, to at least one of the parties, information regarding additional confirms to put in place for future hours, the information determined based on the cryptographic record.

28. An energy contracting system, comprising:

a distributed ledger;

one or more processors; and a computer-readable storage device coupled to the one or more processors and having instructions stored thereon which, when executed by the one or more processors, cause the one or more processors to perform operations comprising:

receiving confirm data comprising a plurality of obligations arising from an energy contract entered into by at least two parties, wherein the obligations comprise physical obligations for an amount of energy and financial obligations for the amount of energy;

generating at least one token based on the obligations, wherein each token comprises a token state and a range for a unit for measuring the amount of energy;

persisting a confirm to the distributed ledger, the confirm generated based on the confirm data and the at least one token;

providing a cryptographic record of the energy contract to each of the parties according to the confirm and the at least one token state;

receiving curtailment data regarding the confirm;

repricing the at least one token according to the curtailment data; and providing dispute resolution to the parties based on the repriced at least one token.

* * * * *

UNITED STATES PATENT AND TRADEMARK OFFICE
CERTIFICATE OF CORRECTION

| | | |
|---|---|---|
| PATENT NO. | : 11,626,990 B1 | |
| APPLICATION NO. | : 17/089523 | |
| DATED | : April 11, 2023 | |
| INVENTOR(S) | : Joshua Weber | |

It is certified that error appears in the above-identified patent and that said Letters Patent is hereby corrected as shown below:

On the Title Page

Item (71) "Carson City, CA (US)" should read --Carson City, NV (US)--

Signed and Sealed this
Ninth Day of May, 2023

*Katherine Kelly Vidal*

Katherine Kelly Vidal
*Director of the United States Patent and Trademark Office*